United States Patent [19]
Reisinger et al.

[11] Patent Number: 6,148,292
[45] Date of Patent: Nov. 14, 2000

[54] METHOD FOR STATISTICS MODE RELOADING AND FOR STATISTICAL ACQUISITION ACCORDING TO STATISTICS CLASSES IN THE STORING OF A DATASET

[75] Inventors: Frank Reisinger, Oranienburg; Olaf Turner, Berlin, both of Germany

[73] Assignee: Francotyp-Postalia AG & Co., Birkenwerder, Germany

[21] Appl. No.: 09/115,048

[22] Filed: Jul. 14, 1998

[30] Foreign Application Priority Data

Jul. 14, 1997 [DE] Germany .......................... 197 31 304

[51] Int. Cl.$^7$ .................................................. G07B 17/00
[52] U.S. Cl. ........................... 705/30; 705/401; 705/404; 713/1; 713/2; 713/100
[58] Field of Search ................................. 377/13, 14, 15, 377/16; 705/30, 401, 404, 410, 60; 713/1, 2, 100

[56] References Cited

U.S. PATENT DOCUMENTS

| | | | |
|---|---|---|---|
| 3,255,439 | 6/1966 | Simjian | 340/172.5 |
| 4,138,735 | 2/1979 | Allocca et al. | 705/409 |
| 4,511,793 | 4/1985 | Racanelli | 705/404 |
| 4,746,234 | 5/1988 | Harry | 400/120 |
| 4,752,950 | 6/1988 | Le Carpentier | 379/106.11 |
| 4,864,506 | 9/1989 | Storace | 364/464.02 |

(List continued on next page.)

FOREIGN PATENT DOCUMENTS

| | | |
|---|---|---|
| 0 285 956 | 10/1992 | European Pat. Off. . |
| 0543397 A2 | 5/1993 | European Pat. Off. . |
| 0660269 A2 | 6/1995 | European Pat. Off. . |
| 0 717 376 | 6/1996 | European Pat. Off. . |
| 0 493 948 | 10/1996 | European Pat. Off. . |
| 0780803 A2 | 6/1997 | European Pat. Off. . |
| 0580274 B1 | 8/1998 | European Pat. Off. . |
| 0566225 B1 | 8/1999 | European Pat. Off. . |
| 0724141 | 2/2000 | European Pat. Off. . |
| 44 46 667 | 6/1996 | Germany . |
| 195 34 530 A1 | 3/1997 | Germany . |
| 195 43 075 A1 | 5/1997 | Germany . |
| 196 17 473 A1 | 11/1997 | Germany . |
| 2 233 937 | 1/1991 | United Kingdom . |

OTHER PUBLICATIONS

Snyder: "An exciting time", Progressive Grocer; Jan. 1996, v75 n1, pp. 134–138.

"Online–Software–Erweiterung und–Änderung," Apel, Elektrisches Nachrichtenwesen, vol. 64, No. 4, pp. 327–333 (1990).

Primary Examiner—Edward R. Cosimano
Attorney, Agent, or Firm—Hill & Simpson

[57] ABSTRACT

In a method for statistics mode reloading and for the statistical acquisition in the storage of a dataset in an electronic postage meter machine, the statistics mode of the electronic postage meter machine created for the acquisition of pre-compressed data according to statistics classes (postal classes) is interchangeably installed. A formation of freely selectable, new statistics instruction data for a future statistics mode ensues in the data center for the purpose of a transmission in the form of an instruction dataset. The installation of the statistics mode ensues during a communication of the postage meter machine with the data center. A microprocessor of the postage meter machine is programmed to change the statistics mode by modem or with another suitable communication means at least periodically or when the mail carrier is changed, or within the framework of a reloading of the postage meter machine. Preceding transactions are provided in the communication mode in order to transmit data of the old statistics mode to the data center. A deletion of the old statistics data ensues after a successfully ended, error-free transaction for interrogating the old statistics data and after a transmission of valid, new statistics instruction data during a following transaction. The acquisition now ensues according to new statistics classes, whereby all check steps for membership in respective statistics classes are executed.

12 Claims, 12 Drawing Sheets

U.S. PATENT DOCUMENTS

| | | | |
|---|---|---|---|
| 4,907,161 | 3/1990 | Sansone et al. | 705/403 |
| 4,931,943 | 6/1990 | Vermesse | 364/464.02 |
| 5,181,245 | 1/1993 | Jones | 380/23 |
| 5,231,668 | 7/1993 | Kravitz | 380/28 |
| 5,243,654 | 9/1993 | Hunter | 380/51 |
| 5,490,077 | 2/1996 | Freytag | 705/405 |
| 5,602,743 | 2/1997 | Freytag | 705/408 |
| 5,606,507 | 2/1997 | Kara | 705/408 |
| 5,666,284 | 9/1997 | Kara | 705/402 |
| 5,671,146 | 9/1997 | Windel et al. | 364/464.2 |
| 5,715,164 | 2/1998 | Liechti et al. | 235/375 X |
| 5,717,596 | 2/1998 | Bernard et al. | 705/404 |
| 5,717,597 | 2/1998 | Kara | 705/408 |
| 5,801,944 | 9/1998 | Kara | 705/401 |
| 5,805,711 | 9/1998 | Windel et al. | 380/55 |
| 5,819,240 | 10/1998 | Kara | 705/408 |
| 5,825,893 | 10/1998 | Kara | 380/51 |
| 5,852,813 | 12/1998 | Guenther et al. | 705/408 |
| 5,926,506 | 7/1999 | Berthold et al. | 375/222 |
| 5,946,671 | 8/1999 | Herring | 705/404 |
| 6,050,486 | 4/2000 | French et al. | 235/101 |

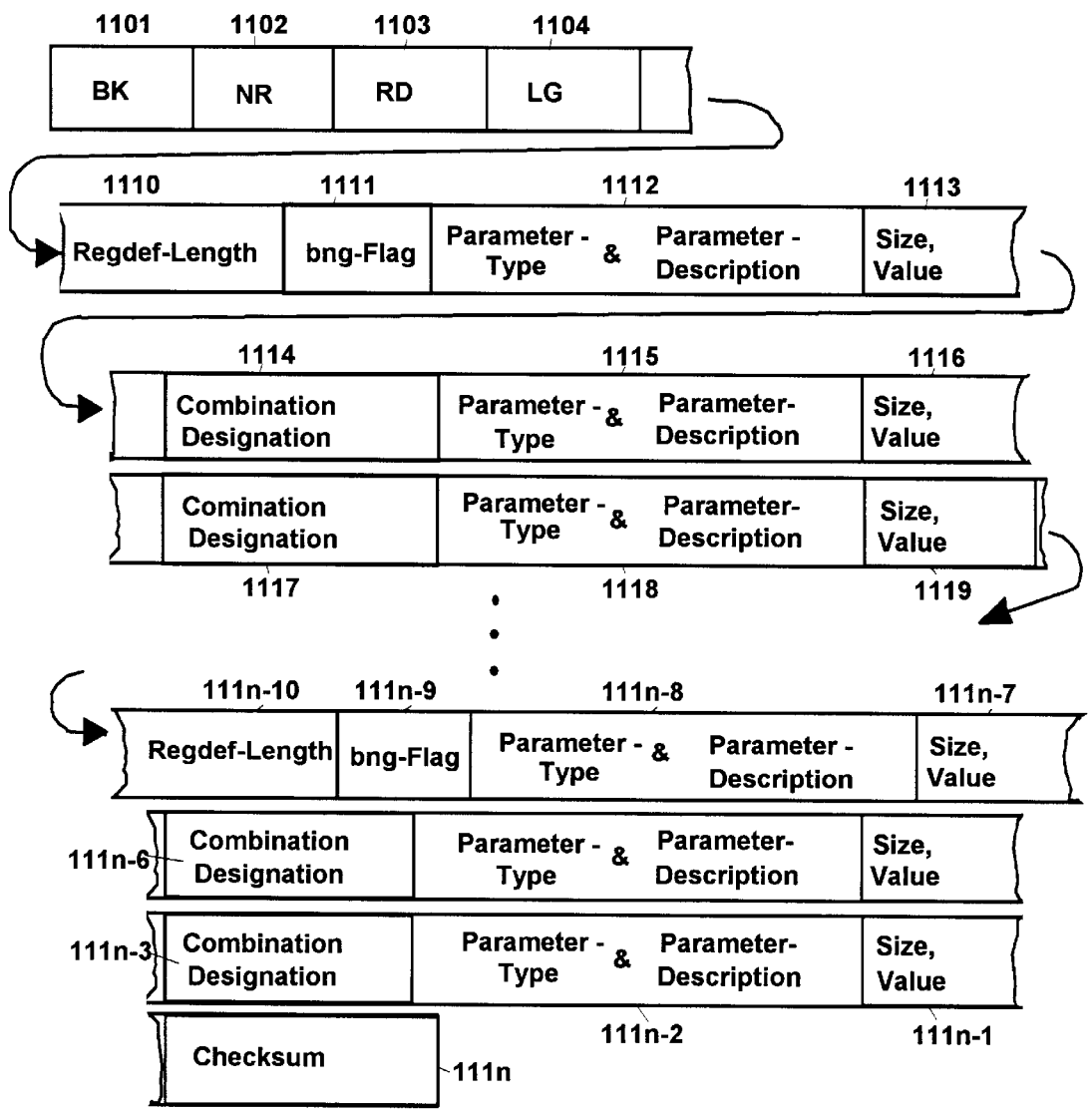
Fig. 11
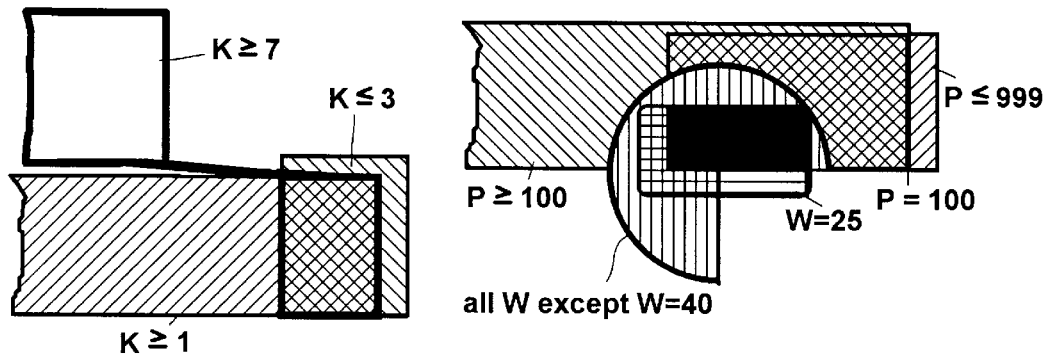
Fig. 13a
Fig. 13b

METHOD FOR STATISTICS MODE RELOADING AND FOR STATISTICAL ACQUISITION ACCORDING TO STATISTICS CLASSES IN THE STORING OF A DATASET

BACKGROUND OF THE INVENTION

1. Field of the Invention

The present invention is directed to a method for statistics mode reloading and for statistical acquisition according to statistics classes in the storing of a dataset in an electronic postage meter machine of the type wherein the postage meter machine can communicate with a remote data center. The term "statistics mode reloading" as used herein means a data communication of statistics instruction data that are arbitrarily flexible, freely selectable and compilable.

2. Description of the Prior Art

Known postage meter machines are equipped at least with an input means, an output means, an input/output control module, a program, data memory means that, in particular, carries the accounting registers, with a control means and with a printer module. Postage meter machines are also known that produce a fully electronically generated imprint for franking postal matter or for comparable purposes.

In a postage meter machine disclosed in U.S. Pat. No. 4,746,234 fixed and variable data are stored in a memory arrangement (ROM, RAM) in order to then read these data out with a microprocessor when a letter on the transport path actuates a microswitch preceding the print position and in order to form a print control signal. Both of the aforementioned types of data are electronically combined to form a print image and can be printed out, for example with a thermal transfer printing means, onto an envelope to be franked. As a rule, a postage meter machine generates an imprint in a standardized form which is flush right, parallel to the upper edge of the postal matter beginning with the content of postage value in the postage stamp, the date in the postmark and stamp imprints for an advertising slogan and, possibly, the type of mailing in the selective print stamp. The postage value, the date and the type of mailing are generated by the variable data which are entered specifically for each piece of mail. Every completed franking must be accounted for and any tampering that leads to a non-debited franking must be prevented.

A large variety of accounting and payment possibilities already exist. The postage value is usually the expediting fee (franking) prepaid by the consignor that is taken from a replenishable credit register and is employed to prepay the mailing.

Known postage meter machines contain three relevant postal registers in at least one memory, namely for used aggregate value (ascending register), remaining credit available (descending register) and a register for a check sum. The check sum is compared to the sum of used aggregate value and remaining credit available. A review for correct accounting is thus already possible. Given the known accounting with a prepaid credit, the memory arrangement includes at least one non-volatile memory module that contains the currently remaining available credit, which results from the postage values of the successively printed frankings being subtracted from a credit loaded into the postage meter machine earlier. The postage meter machine is automatically placed in a blocked (non-functioning) state when the remaining credit is zero. This remaining amount can be replenished by a recredited amount by conducting an authorized recrediting procedure.

A protected reloading procedure for a postage meter machine with a credit is described in U.S. Pat. No. 3,255,439 generates an automatic signal transmission from the postage meter machine to the data center whenever a predetermined amount of money that was franked or whenever an item number of processed mail or a predetermined time period was reached. Alternatively, a signal corresponding to the sum of money, the item number or time period can be communicated. The communication ensues with binary signals via converters connected to one another over a telephone line. The machine receives a reloading that is likewise protected and corresponds to the credit balance and blocked state if no credit is re-supplied.

U.S. Pat. No. 4,864,506 discloses a procedure wherein, preceding a credit reloading into the postage meter machine, the data center interrogates the identity number of the postage meter machine and the values in the descending and ascending registers for authorization. Further, this patent discloses that the communication of the data center with the postage meter machine need not remain limited to a mere credit transfer into the postage meter machine. On the contrary, the communication of the data center with the postage meter machine is used for transferring the remaining credit of the postage meter machine into the data center when the postage meter machine logs off at the mail carrier. The value in the descending postal register of the postage meter machine is then zero, which effectively takes the postage meter machine out of operation. It is self-evident that suitable security measures must be undertaken so that the credit stored in the postage meter machine is not increased in an unauthorized way and then transferred back into a bank account.

German OS 44 46 667 (corresponding to co-pending U.S. application Ser. No. 08/955,072 filed Oct. 21, 1997) discloses specific security measures. The security measures relate to a protected data transmission in all transactions as well as to the monitoring for complete implementation of a second transaction. After the postage meter machine sets up communication with a remote data center, which checks the communicated PIN and acknowledges receipt, a first encrypted message is sent to the data center by the part of the postage meter machine. The value crediting request, identification data, postal register data and CRC data (cyclic redundancy check) are encrypted in the encrypted message with DES algorithm (data encryption standard), for which a first key is employed. Subsequently, the postage meter machine is to receive and decipher a second encrypted message. The first key is again applied for deciphering. The second encrypted message contains a second key, identification data and transaction data. The verification ensues on the basis of the communicated identification data. The second key required for deciphering subsequent transaction data and the transaction data (requested credit value) are stored. The implementation of a second transaction, which sequences comparably, ensues after this first transaction with the communication of the aforementioned request, however, the requested credit value is stored as credited value and the implementation is monitored for completeness.

According to British Specification 22 33 937 and U.S. Pat. No. 5,181,245, the postage meter machine periodically communicates with the data center. A blocking means allows the postage meter machine to be blocked after the expiration of a predetermined time, or after a predetermined number of operation cycles, and supplies a warning to the user. For enabling franking, an encrypted code must be entered from the outside, this being compared to an internally generated encrypted code. In order to prevent false accounting data from being supplied to the data center, the accounting data are also involved in the encryption of the aforementioned code. A disadvantage is that the warning ensues simultaneously with the blocking of the postage meter machine without the user having advance notice so as to avoid a franking interruption. U.S. Pat. No. 5,243,654 discloses a postage meter machine wherein the continuous time data supplied by the clock/date module are compared to stored disable time data in order to deactivate the postage meter machine given equality between these data. In this case, the operation of the machine is interrupted and the user must manually actuate new inputs in a complicated way. This procedure also prevents a printing and (intentionally) requires the user periodically to report his postage meter machine at the data center in order to communicate accounting data (aggregate used amount from the ascending register). The postage meter machine could be blocked for an unnecessarily long time because of the manual user inputs, particularly given an inexperienced user.

Francotyp-Postalia AG & Co. has developed a number of automatically acting security measures that are implemented unnoticed by the user and without the user's input. As described in European Application 660 269 (corresponding to U.S. Pat. No. 5,671,146), the protection of register values that are stored in a non-volatile NVRAM is implemented with a MAC (message authentification code). This solution protects against a manipulation with a microprocessor in a control unit of the postage meter machine. This is programmed with a possibility of entering into a communication mode with a remote data center for the implementation of steps for a start and initialization routine and subsequent system routine. After further steps for entering into a franking mode, a branch is made back into the system routine from the franking mode after execution of an accounting and printing routine. Checks are implemented with a selected checksum method within an OTP processor (one-time programmable) that contains the corresponding program parts stored internally and also the code for forming the MAC. A person attempting tampering therefore cannot replicate the type A of checksum method. Further security-relevant key data and executions are also stored exclusively in the inside of the OTP processor in order to place a MAC protection over the postal registers.

The apparatus and method of European Application 660 269 are based on a postage meter machine that has a closeable and lockable flap that allows access to the hardware lying therebehind (EPROM base) only to a limited, trustworthy group of persons. It must be assumed that no tampering of the postage meter machine would be carried out by these persons. The user has no access to the slogan EPROM base and cannot independently exchange this slogan EPROM. Other advertising slogan data or postage fee schedule data thus can be installed only by a service technician who is authorized to open the postal flap (opening authority). Security cannot be maintained for a postage meter machine that has a partially open postal flap. This disadvantage is eliminated in a method described in German Patent Application 19534530 (corresponding to U.S. Pat. No. 5,805,711). The machine described therein is capable of communication with a remote data center and contains an OTP processor in a control circuit of the postage meter machine. The program parts that are implemented in the internal OTP-ROM also enable a protection of externally stored program parts that, for example, are stored in an EPROM. The user now has access to the slogan EPROM base and can independently change a slogan EPROM. The user himself, who is authorized to open the flap over the EPROM base, can thus also instal other advertizing slogan data or postage fee schedule data. Thus, a limited servicing is carried out by the user himself, which, however, makes a machine-internal check necessary for A misuse of the limited access allowed by the user. A start security check occurring in the framework of the start and initialization routine sequences before a secure print data call routine and before the following system routine. This serves the purpose of determining the validity of a program code and/or the validity of data in the predetermined memory location on the basis of an appertaining MAC (message authentification code) that is stored in the same memory means. The check for valid program code and/or for valid data ensues with a selected checksum method within an OTP processor that internally contains the corresponding program parts. A transfer of the postage meter machine into the aforementioned system routine ensues given validity of the data. A check of the data in the postage meter machine likewise ensues in the aforementioned system routine. If data are invalid, or if a specific tampering criterion is met, the postage meter machine is switched into a first mode that contains steps for the prevention of franking, or for blocking the postage meter machine and/or steps for the prevention of a further program execution, or for causing a program branch leading to the outside from the OTP processor in the framework of the aforementioned system routine.

Authenticity checks are also provided in the result of the print data input in the print data call routine for frame and/or window data as well as during the start and initialization routine as well as during the system routine in the step for keyboard interrogation and display of security-relevant window data that were modified in the print data input. Given an absence of authenticity, steps are triggered for the prevention of a further program execution or a program branch is triggered leading to the outside from the OTP processor. This check has the advantage that program code and constant, security-relevant data cannot be modified, nor skipped nor surreptitiously identified. The program execution of program parts that are executed in the internal OTP-ROM thus can not be manipulated. There is a reliable protection against fraudulent manipulation as long as no program branch occurs. Even in a faulty or manipulated postage meter machine the program execution remains completely in the OTP-ROM and cannot be forced into other operating modes.

A method for securing data and program code of an electronic postage meter machine is described in German Application 19534530 and U.S. Pat. No. 5,805,711. The teachings of co-pending U.S. Pat. No. 5,805,711 are incorporated herein by reference. This method includes the transmission of an externally stored, predetermined MAC value into the internal OTP-RAM and formation of a checksum in the OTP processor over the content of that external memory to which the MAC is allocated, and a comparison of the result to the predetermined value of the MAC volatilely stored in the internal OTP-RAM before and/or after the end of the franking mode or operating mode, and thus also after the initialization (i.e. when the postage meter machine is being operated) or at times when printing is not being carried out (i.e. when the postage meter machine is operated in standby mode). In the event of a fault, a logging and subsequent blocking of the postage meter machine ensues. A number of keys and an encryption algorithm that is employed in the program execution of security-relevant transactions and in the external storing of security-relevant data are also stored in the OTP-ROM. The aforementioned solution also assumes that the funds stored in the postage meter machine must be protected against unauthorized access. The falsification of data stored in the postage meter machine thus is made so difficult that the outlay is no longer worthwhile for a tamperer. The only disadvantage of this solution is that the user is required to perform a limited servicing. For example, a current postage fee table must be loaded when the carrier fee schedules change. In general, however, it is desirable not to burden the user—insofar as possible—with further tasks or services if this is not absolutely required.

Some postal authorities/mail carriers now require, or employ price reductions to promote, preparation by the user of printouts of operating sequences stored in the postage meter machine, for documents/bills of lading accompanying bulk mail/freight or accountings performed in a time period, or printout of statistics or receipts about a reloading that has ensued for replenishing credit. According to European Application 285 956, a postage meter machine is equipped with a specific operating sequence memory and with a connection for an external printer, however, seeking and printing specific data from the stored, periodic acquisition of all data demands that the user make a high time outlay available for such purposes.

European Application 493 948 also discloses a postage meter machine that is equipped with a number of registers in a protected module for storing accounting data that relate to the use of the postage meter machine for franking items. A first set of registers relates to a specific, first service, and a second set of registers relates to a specific, second service, whereby the specific services are selectable via the input means and the accounting data of the respectively selected service are updated. One shipping mode to be separately accounted for is, for example, "first class", which is preferred in the expediting. Another shipping mode to be separately accounted for is, for example, "second class". The shipping mode can be printed as a selective print stamp separately from the franking stamp or integrated therewith. Only certain services, however, are covered, and it is difficult for the postage meter machine manufacturer to predict for future mail carriers what services will be offered by such future carriers that then have to be separately accounted for as well. As needed, postage meter machines would then have to be refitted for new mail carriers or new services either in the factory or by a service technician, which would be very complicated. The accounting reports would likewise have to be printed out by a separate, second printer. A validity check by the microprocessor is provided for securing register values. For every printout of accounting reports, the microprocessor generates a validity code for register values that is printed out together therewith.

European Application 717 376 discloses a postage meter machine and a communication procedure to a data center both for register interrogation and credit reloading as well as for other administrative purposes. The communication can ensue online via modem or offline via chip card. A DEC CBC mode (data encryption standard & cipher block chaining) is utilized for authentification of the data. The postage meter machine has definition means for at least one group of mail classes. The postage meter machine has an item counter for each mail class in order to count the number of franked postal items per mail class. The mail classes are defined by upper and lower limit values for postage values. The data center can define at least one group of mail classes, particularly the upper and lower limits therefor. The data center can change this definition at predetermined times and limit the use of the postage meter machine, for example in terms of time, number of items and with respect to a cumulative value. The underlying statistics structure, however, can only be used fully or limited but not fundamentally modified.

SUMMARY OF THE INVENTION

An object of the present invention us to the disadvantages of the prior art and enables a general modification of the structure of the method for statistics of arbitrarily form in structure. The acquisition of a requested service or postage meter machine usage information should be possible in a versatile form and be variable as needed. Another object is to provide such a method which is capable of accommodating requirements for acquiring a specific service or postage meter machine usage information that arise at a later time, i.e. are only subsequently expressed by the postal authority or a private mail carrier.

The entry of the acquisition conditions and retrieval of the acquired data should ensue automatically, optimally without input from the postage meter machine user. The postage meter machine should thereby not be blocked, or at least should not be blocked for an unnecessarily long time.

A further object is to provide a more flexible solution for the specific acquisition of postage meter machine usage information, suitable for accounting vis-a-vis the postal authority or a private mail carrier as well as for a plurality of joint users of the same postage meter machine, or for department-by-department accounting. A secondary object is to improve the security of the accounting and usage data in the postage meter machine that are statistically stored in the postage meter machine in a predetermined way and that are interrogated given a communication with the data center.

The above objects are achieved in accordance with the principles of the present invention in a method for statistics mode reloading and statistical acquisition according to statistics classes in the storage of a dataset in a postage meter machine, wherein a microprocessor in the control unit of the postage meter machine is programmed in order to enter into a communication mode with a remote data center for the transmission of statistically acquired data to the data center and for the modification of parameters of the statistical data acquisition in the postage meter machine. In accordance with the inventive method, freely selectable, new statistics instruction data are formed in the data center for a future statistics mode, the new statistics instruction data including selectable operation instructions for the class formation in order to enable a pre-compression of the data. Communication between the postage meter machine with the data center is established in order to transmit the data acquired in a statistics mode in the postage meter machine to the data center, and in order for the postage meter machine to receive the new statistics instruction data from the data center for forming a new statistics mode. Upon receipt of the new statistics instruction data from the data center by the postage meter machine, the new statistic instruction data are stored in a nonvolatile memory of the postage meter machine. In subsequent executions of its operational program, the postage meter machine acquires pre-compressed data according to the statistics classes stored in the postage meter machine, with the sorting or entry of the raw data, acquired during operation of the postage meter machine, into respective statistics classes (i.e., membership allocation), and interpretation of the accumulated statistics classes, taking place in the postage meter machine in accordance with the stored statistics instruction data.

The invention is based on the need of some mail carriers to optimize their operations. Inventively, a very flexible solution is created for installing an acquisition according to classes, particularly for an accounting according to pre-condensed or pre-compressed classes, in an electronic postage meter machine, whereby the mail carriers respectively define classes according to their own requirements. The acquisition according to statistics classes in a statistics mode of the electronic postage meter machine thus cannot be permanently installed; rather, an automatic procedure is employed for changing the statistics mode by modem or with some other suitable transmission means. That ensues as needed or at least when a change is made to a new mail carrier whose instructions are not yet stored in the postage meter machine. A statistics mode inventively defined by the aforementioned instructions and in which the implementation of an arbitrary statistical usage data acquisition is possible exists within a franking mode in the program execution of a postage meter machine. For the administration of a universally modifiable franking statistics, the data center prescribes the form of statistics to maintained that is of interest at the moment for the postage meter machine via a suitable protocol and defines a pre-compression rule for the classes. After communication, verification and intermediate storage of new statistics instruction data during an inventively further transaction, a message (data sequence) related to the intermediately stored, valid, new statistics instruction data is communicated to the data center. After checking the message, the data center communicates instructions to store the new statistics instruction data in a non-volatile memory. An error routine is executed if an error is determined in the result of the check for the presence of a successfully ended transaction, or a check for freedom from error and the postage meter machine may be initialized to repeat the steps. After a corresponding prescription of instructions, i.e. after the prescription of the franking parameters communicated to its processor, or pre-stored, the postage meter machine automatically classifies the data of interest into suitable registers. To that end, the postage meter machine has a suitable separate or non-volatile memory with separate internal memory areas, with at least one of the internal memory areas being used to non-volatilely store the aforementioned instructions and at least one other internal memory area being used to non-volatilely store the aforementioned data. The method of the invention accomplishes these results by the following steps.

Freely selectable, new statistics instruction data are formed are formed in the data center for a future statistics mode, the new statistics instruction data including selectable operation instructions for class formation in order to enable a pre-compression of the data.

Communication is established between the postage meter machine and a data center in order to transmit the data acquired in the statistics mode to the data center and in order to receive the new statistics instruction data for forming a new statistics mode.

The data center communicates of an instruction to the postage meter machine in order to store the new statistics instruction data in a non-volatile memory of the postage meter machine.

The postage meter machine compiles pre-compressed data according to statistics classes in the postage meter machine, with all check steps for affiliation with respective statistics classes being executed and an interpretation corresponding to the statistics instruction data, applied to the compiled data, ensues.

Additionally, during the aforementioned communication a transmission of other information from the postage meter machine to the data center can take place, and a check of the information is made, in the data center, the information being referenced to the intermediately stored, valid, new statistics instruction data. The information communicated to the data center preferably contains the version number and a checksum over the instruction data or a DES-encrypted checksum or an RSA signature. The non-volatile storage ensues in the postage meter machine only given an established reference, with an error routine being conducted given the absence if a reference.

On the basis of a protocol described in greater detail below, the data center provides the postage meter machine with instructions as to how the frankings are to be allocated to specific statistics classes. These instructions may be periodically provided when the postage meter machine periodically reports to the data center. A corresponding automatic procedure is provided in the postage meter machine, so that a communication preferably ensues after a predetermined time lapse or after a predetermined number of frankings is reached. Such a statistics mode reloading can likewise be implemented in conjunction with a credit reloading. Separate communication modes or a correspondingly fashioned communication mode are provided therefor in the postage meter machine in order, given an automatically set up communication, to retain the set parameters for the credit reloading unmodified without implementing a credit reloading.

The number of statistics classes is fundamentally unlimited, except by the corresponding memory capacity of the postage meter machine. By accumulating data, preferably by counting item numbers per class, the amount of data to be stored and to be transmitted is kept within reasonable limits, i.e. relatively small. If necessary, a pre-compression of data in the postage meter machine can be implemented in some other way, i.e. according to a different mathematical function, before the storage in registers ensues. The acquisition then ensues according to the statistics classes thus defined, whereby all check steps for affiliation with respective statistics classes are executed and an interpretation corresponding to the instructions, applied to the data to be acquired, ensues.

Commercially available OTP processors can store all security-related program parts and the algorithm for forming a DES-encrypted checksum (MAC) in the inside of the processor housing, as disclosed in detail in the aforementioned German Patent Application 19534530 (corresponding to U.S. Pat. No. 5,805,711). The method disclosed therein includes a statistics mode in the franking mode in which statistics and/or accounting data can be protected against manipulation by MAC. Inventively, the accounting and/or acquisition of usage data ensues according to statistics classes that are freely defined by the data center with parameter types and appertaining descriptions and operations and are communicated to the postage meter machine. Due to a cumulative MAC formation, the amount of data to be secured can be larger than in the previously standard MAC formation. A significant increase in security is thereby achieved in the storage of the accounting data in the postage meter machine without the postage meter machine being blocked for an unnecessarily long time.

In the limiting case, as well given a very large amount of data to be secured, all data can nonetheless be stored MAC-protected. This, for example, is the case when the number of statistics classes coincides with the number of possible postage values and/or statistics classes in which carrier and/or cost center-related entries are additionally undertaken, i.e. entries that are differently defined for different users.

The fetching of the accounting or usage data ensues as needed or in conjunction with the remote reloading of the postage meter machine with a credit (recrediting), with the security measures of the credit recrediting also being to protect the accounting or usage data.

An even higher security of the postage meter machine is achieved by automatic, periodic accounting during the course of an automatic communication with a remote data center. This sequences without disturbing the user and without causing the user to make manual inputs. The possibility for the electronic accounting by modem vis-a-vis the postal authority or a private mail carrier, or for a number of joint users of the same postage meter machine advantageously avoids the printout of extensive accounting reports. A second printer is not required. The electronic accounting by modem ensues within a transaction. In a further transaction, a new, valid, predetermined instruction for specific accounting of the services offered by the selected mail carrier can be communicated from the data center, this being referred to below as statistics mode reloading.

DESCRIPTION OF THE DRAWINGS

FIG. 11 is block diagram for the definition of the statistics mode instructions in the context of the inventive method.

FIGS. 13a and 13b graphically illustrate the definition of a statistics class in the context of the inventive method.

DESCRIPTION OF THE PREFERRED EMBODIMENTS

Figure 1A:
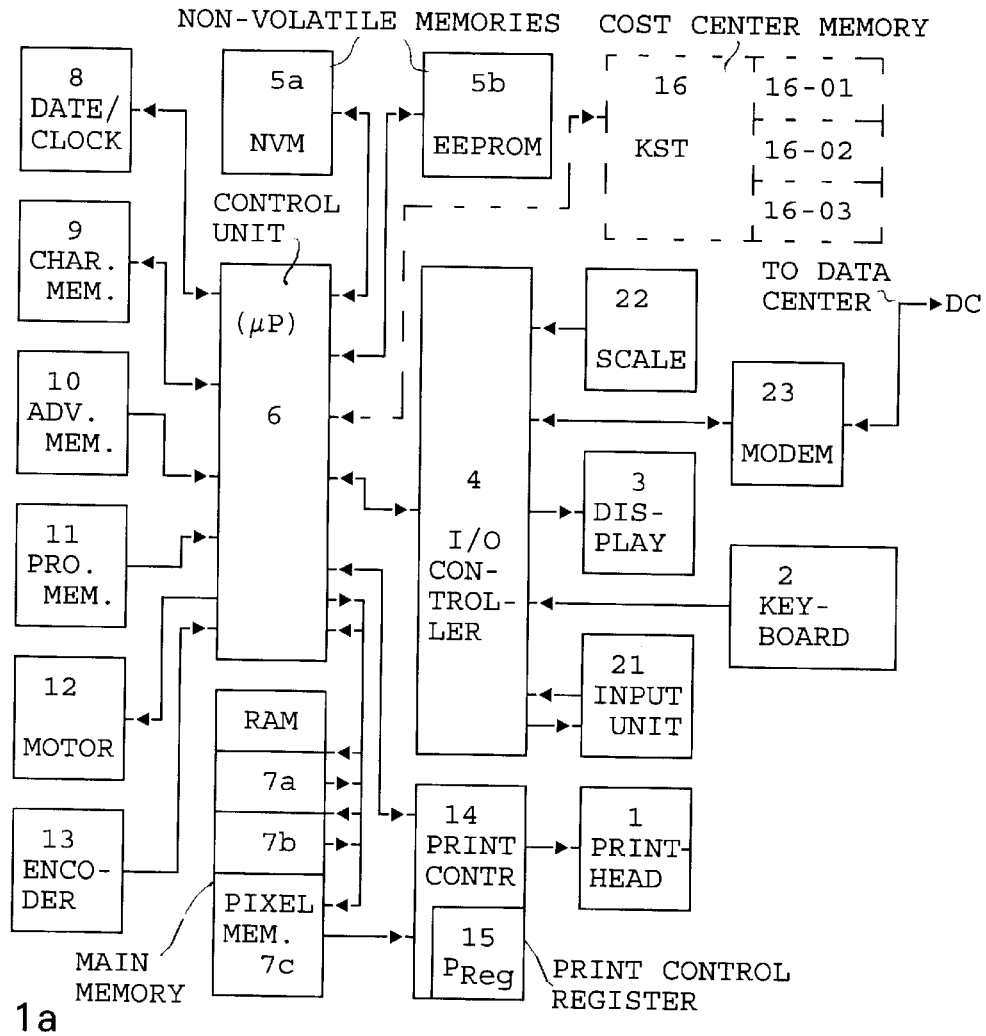
FIG. 1a is block circuit diagram of a postage meter machine operable in accordance with the inventive method.

FIG. 1a shows a block circuit diagram of a postage meter machine operable in accordance with the inventive method. The postage meter machine has a printer module 1 for a fully electronically generating franking image, at least one input unit 2 with a number of actuation elements, a display unit 3, a modem 23 producing the communication with a data center, a input unit 21 and/or a scale 22 that are coupled to a control unit 6 via an input/output control module 4, and non-volatile memories 5a, 5b and 9, 10 and 11 for data or programs that include the variable or constant parts of the franking image.

Further details about individual functions of the postage meter machine are described in the aforementioned German Patent Application 19534530 (corresponding to U.S. Pat. No. 5,805,711). A character memory 9 supplies the necessary print data for the variable parts of the franking image to a pixel memory 7c in a random access memory RAM. The control unit 6 is a microprocessor $\mu P$ that is in communication with the input/output control module 4, the character memory 9, memory areas 7a and 7b (as well as 7c) of the RAM, and with non-volatile main memories 5a, 5b (with internal cost center memories) or (shown with broken lines) with an additional cost center memory 16, a program memory 11, the motor 12 of a letter transport or feeder arrangement, possibly with a tape dispenser, an encoder (coding disk) 13 as well as with a clock/date unit 8. The memory module that forms the non-volatile main memory 5b can, for example, be an EEPROM that is secured against removal by at least one additional measure, for example gluing on the printed circuit board, sealing or casting with epoxy resin. The cost center memory can be realized separately or, for example, within the non-volatile memory 5a as special memory areas thereof. Inventively, separate memory areas are now provided for keeping an arbitrary statistics. The individual memories can be realized in a number of physically separate components or combined in a few components in a way that is not shown. The separate memory areas 16-01, 16-02 and 16-03 provided for keeping an arbitrary statistics include at least one memory area 16-03 in which the accounting structure that is currently valid, but is variable in a defined way, is stored. In a statistics mode (FIG. 2, FIG. 12a and 12b), a statistics routine is correspondingly implemented by the microprocessor according to this accounting structure and the data are stored in the memory area 16-02. A defined modification of the accounting structure ensues—only as needed—in a communication mode I or II (FIGS. 2, 3, 4, 5 or 9, 10). The statistics mode having the steps 416 through 430 is called by the microprocessor within a franking mode 400.

Figure 1B:
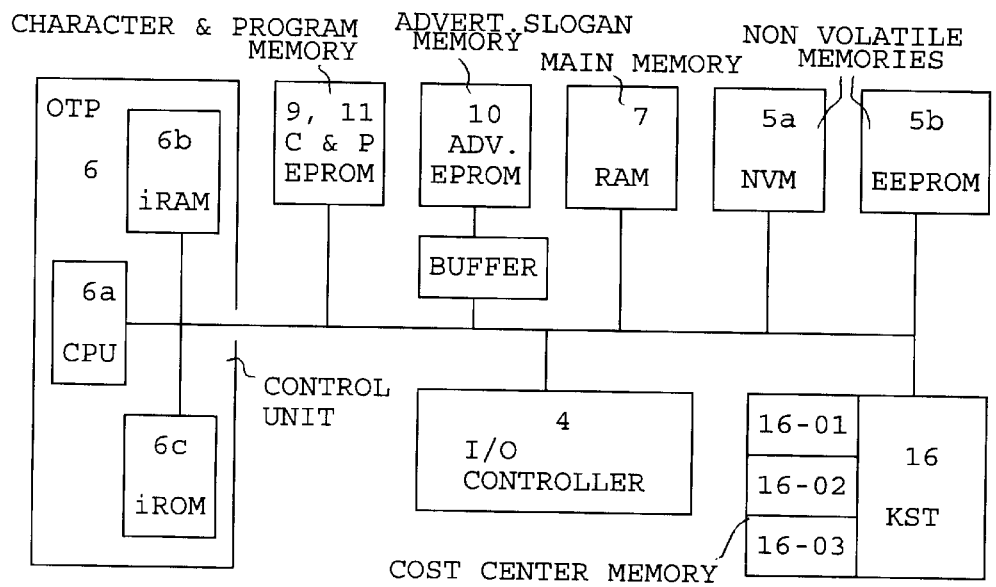
FIG. 1b is a block diagram of another embodiment of a postage meter machine operable in accordance with the inventive method with a separate cost center memory and with an OTP in the control circuit of the postage meter machine.

FIG. 1b shows a block circuit diagram of an electronic postage meter machine with inventively enhanced security. The invention is based on a postage meter machine with a microprocessor 6a(CPU) containing an internal OTP-RAM 6b(iRAM) and an internal OTP-ROM 6c(iROM) that does not allow a readout of the program code contained therein. Moreover, security-related data are stored in the internal OTP-ROM 6c. For preventing the readout by an external intervention, corresponding security bits can be set in the microprocessor during the manufacture of the postage meter machine. This can be a commercially available OTP processor that is placed into such a condition after the programming event by setting/burning a readout block or this can be a microprocessor with mask-programmed ROM that no longer allows a readout of the program code after the manufacturing process. The postage meter machine can also be equipped with an OTP type that allows a readout of security-relevant data and programs in encrypted form (encryption table). This has the advantage that it is possible to check whether the data were properly stored. Since the entire program code needed for the operation of a postage meter machine does not fit in the microprocessor-internal ROM 6c, the majority portion of the program code is stored in a further EPROM, Which serves as a character and program memory (designated C&P EPROM) which makes the program code available to the microprocessor 6a via the microprocessor bus. An arrangement can be employed for this purpose that divides the program memory into memory segments, referred to as memory banks, that allow the program memory area to be arbitrarily enlarged via the address area of the microprocessor by using microprocessor port lines. The OTP 6 is also in communication with an EPROM that contains data for the advertising slogan (advertising slogan memory, designated ADV. EPROM) and a main memory 7 (RAM). The other components of FIG. 1b have the same reference designations as in FIG. 1a.

FIG. 1b shows details of the block diagram of the electronic postage meter machine for a version with OTP in the control circuit that is also disclosed in terms of function in German Patent Application 19534530 (corresponding to U.S. Pat. No. 5,805,711).

Figure 2:
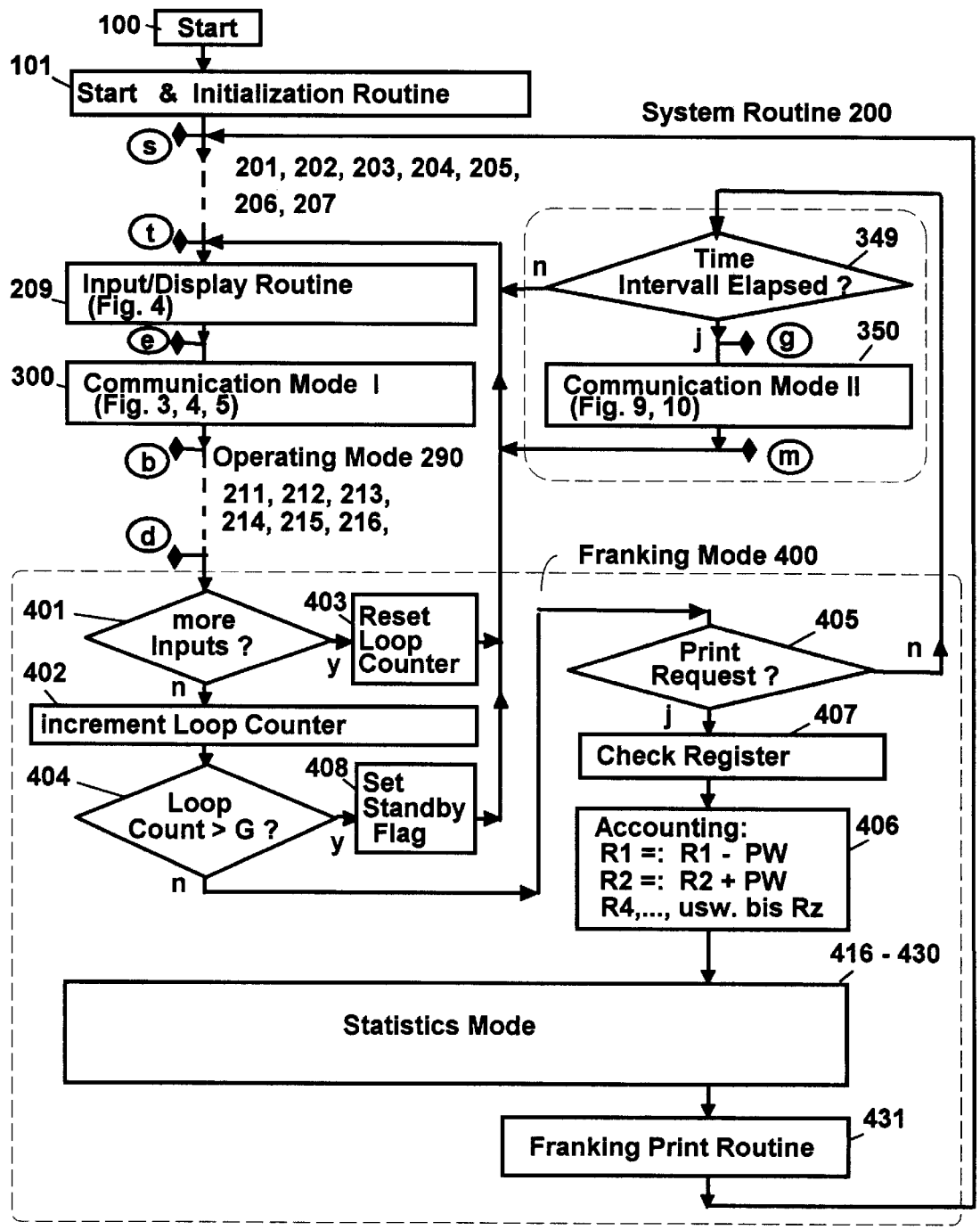
FIG. 2 shows an overall flowchart of the inventive method.

FIG. 2 shows an overall flowchart for a postage meter machine with inventively enhanced security. As shown therein, after the postage meter machine is turned on, a function check with subsequent initialization ensues in the step Start 100 within a start routine 101. A program code in the non-readable, internal OTP-ROM now allows a number of advantageous start security check routines, as disclosed in detail in German Patent Application 19534530 (corresponding to U.S. Pat. No. 5,805,711). A branch is subsequently made to the point s of a system routine 200.

The constant parts of the franking image called during the initialization routine 101 are constantly available in decoded form in the pixel memory area I in the volatile pixel memory 7c. A second memory area B exists in the non-volatile main memories 5a and 5b for a fast modification of the window data. The number strings that are entered for generating the input data via a keyboard 2 or via an electronic scale 22 that is connected to the input/output module 4 and calculates the postage value, are automatically stored in the memory area D of the non-volatile main memories 5a and 5b. Datasets of the sub-memory areas, for example $B_j$, C, etc., are also preserved. It is thus assured that the last-entered quantities are also preserved when the postage meter machine is turned off, so that, after being turned on, the postage value in the value stamp is automatically prescribed according to the last input before the postage meter machine was turned off and the date in the postmark is automatically prescribed according to the current date. When entering into the system routine 200, a step 201 (not shown in FIG. 2) is initially reached for the automatic data fetching of the aforementioned, non-volatilely stored data.

A number of further steps that improve the data security can lie between the points s and t of the system routine 200, as disclosed in detail in German Patent Application 19534530 (corresponding to U.S. Pat. No. 5,805,511).

Further steps 202 through 208 described in German Patent Application 19534530 (corresponding to U.S Pat. No. 5,805,711) can be run. After these steps, the point t of the system routine 200 is reached in any case and a branch is made to the step 209. The user has the possibility of modifying input data or, respectively, manually entering new data. After a new input and keyboard interrogation has ensued in the input/display routine of step 209, a print data compilation and call of the required picture element datafiles ensues in the same step 209, as disclosed in detail in German Patent Application 19534530 (corresponding to U.S. Pat. No. 5,805,711).

Figure 3:
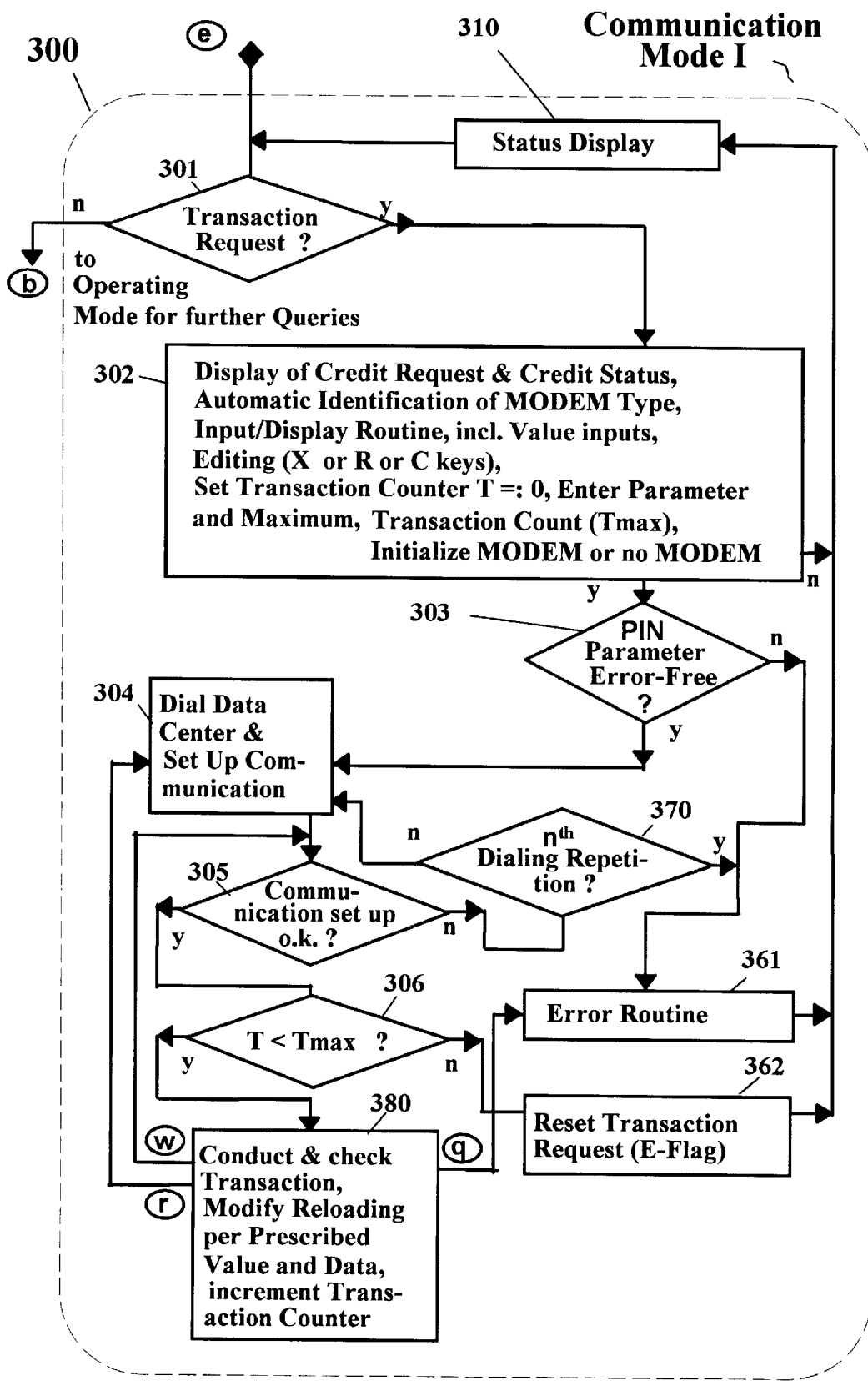
FIG. 3 is flowchart for the first communication mode I of the inventive method.

Following the step 209 and assuming that no relevant deficiencies were found, the point e of the system routine 200 is reached, i.e. the beginning of a communication mode 300. FIG. 3 shows a flowchart for the first communication mode I that will be explained in greater detail below. At the very beginning of the communication mode, an interrogation is made in a step 301 as to whether a transaction request is present. If this is not the case, the communication mode 300 is exited and the point b is reached, i.e. an operating mode 290.

Figure 5:
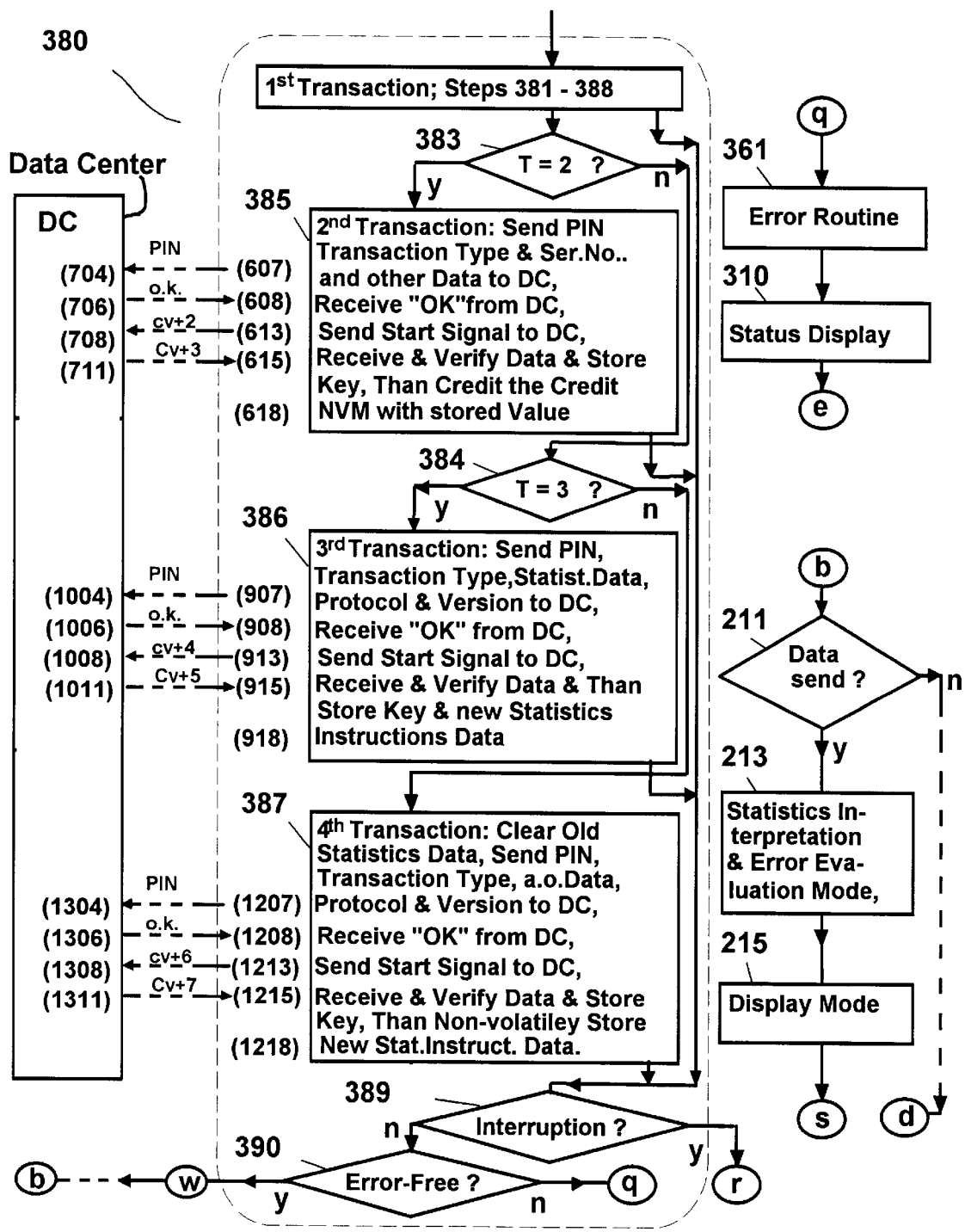

A multitude of further steps can lie between the points b and d of the operating mode 290. In the step 211, the data communicated in the communication mode or a set standby flag can be found (FIG. 5). In this case, a branch is to be made to the step 213 for further data interpretation. Other interrogation steps are required in order, given a test request 212, to enter into the test mode 216 or, given an intended register reading check 214, to enter into a display mode 215, as disclosed in detail in the aforementioned German Patent Application 19534530 (corresponding to U.S. Pat. No. 5,805,711).

A specific step (not shown in FIG. 2) relates to an interrogation as to whether receipt documents about performed accountings are to be printed out for each cost center via the internal printer of the postage meter machine. A suitable method and arrangement for an internal cost center printout are disclosed by European Application 580 274.

A specific, further step (not shown in FIG. 2) makes a query as to whether register data or other internal data of the postage meter machine are to be printed out via the internal printer of the postage meter machine. Further query steps for switching into further modes can likewise be inserted into the overall flowchart according to FIG. 2 in a comparable way or can already be a component thereof as sub-steps of the input/display routine in step 209, as disclosed in the European Application 780 803.

As proceeds from FIG. 1a, the main memory 7b and the pixel memory 7c are in communication with the printer module 1 via a print controller 14 comprising a print register 15 and an output logic stage. The pixel memory 7c has an output side connected to a first input of the print controller 14. Further control inputs of the print controller 14 are supplied with output signals of the microprocessor control unit 6. When a letter detector (not shown) connected to the microprocessor of the control unit 6 finds a letter in the franking print region of the postage meter machine, a print request signal is formed, as is known. The accounting ensues before the printing of the franking image. When all columns of a franking image have been printed, a branch is made back to the system routine 200. If a scale 22 is connected to the postage meter machine, the postage value communicated from the scale 22 is taken from the memory area D in the step 201 of the system routine 200. The collaboration of postage meter machine and scale under the condition that a number of selectable mail carriers have different fee schedules is disclosed in detail in European Application 724 141.

When inputs are automatically or manually actuated, the point d, i.e. the franking mode 400, is reached, possibly after checking proper functioning. A check is carried out in the first step 401 of the franking mode 400 as to whether an input is present. Given a renewed input request, which can be determined in the step 401, a branch via a third step 403 with resetting of a loop counter S is made back to the point t of the system routine 200 and, subsequently, to the step 209 to the input/display routine. For example, a cost center number can be entered by the user who wishes to store a department-by-department accounting, i.e. accounting data listed according to the respective cost center number. In particular, it can be advantageous for small-scale companies when a number of joint users use the same postage meter machine but wish to account separately for their usage, possibly with employment of different mail carriers. A number of accountings corresponding to the number of cost centers can be implemented for a single postage meter machine.

Otherwise, i.e. no input request is present, a branch is made via the steps 402 and 404 for incrementing the loop counter S and for checking the number of loops to a fifth step 405 in order to identify if a print request is present. The letter to be franked is detected by a letter sensor and a print request is thus triggered. A branch to the accounting routine in the sixth step 406 can thus be made here via a seventh step 407 for register checking. In the sixth step 406, the accounting data are also debited and stored carrier-specific under the selected cost center number. Further queries are potentially actuated in the following steps 406 and 407. For example, the presence of authentic register values is checked in the step 407 on the basis of a MAC. Moreover, further steps (not shown here) related, for example, to a large variety of payment possibilities can be executed before the franking print routine 431 is reached.

In step 406, i.e. during the accounting routine ensuing immediately before the printing, a specific counter is caused to count one counting step farther, so that the number of all previously implemented frankings can be acquired. The number of printed letters and the current values are likewise registered in the accounting routine 406 according to the entered cost center and are available in the postal registers in non-volatile memories 5a, 5b or, respectively, 16 of the postage meter machine for a later interpretation. All of the aforementioned inputs remain stored and can only be modified after exiting the franking mode.

If, the carrier and cost center information are to be employed for the accounting in the franking mode 400, then, when a print request is recognized in the fifth step 405, a mail carrier-specific memory area is first selected (sub-step 4061 of step 406, not shown) and then a further sub-step 4062 (not shown) is reached in order to form sub-addresses. The sub-addresses are formed for the memory areas of, first, a cost center number zero and, second, a selected cost center number that was set differing from zero for the department-related accounting. An accounting over the sum of all cost centers for the respectively selected, individual carriers m (with m=1 through l) ensues under the cost center number zero without division into individual cost centers or departments, as disclosed in detail in German Application No. 196 17 473 (corresponding to co-pending U.S. application Ser. No. 08/850,788 filed May 2, 1997). Periodically or in freely selected time spans, a resetting to zero for the postage used as well as for the number of items can ensue after an accounting and output of a listing for a cost center. As needed, the output of such a listing can ensue, for example, as a cost center printout or as a carrier-related printout on a tape with the postage meter machine.

Inventively, an additional statistics set is now kept in a statistics mode within the postage meter machine according to the wishes of the respective mail carrier. Various versions are possible as to how one proceeds further in the steps of the statistics mode after the step 406 before the franking print is implemented in step 431. The postage meter machine user has no possibility of influencing the structure or the nature and manner of the data acquisition in the statistics mode. A possibility of influencing the acquisition of the data of interest exists on the basis of the statistics mode reloading, i.e. on the basis of the communication of instructions from the data center to the postage meter machine during a communication mode I or a communication mode II. FIG. 11 shows a block diagram of the instruction for the definition of the statistics mode that allows maximum definition freedom and flexibility, which shall be explained in greater detail.

The statistics mode that is driven within the franking mode 400 before the franking print routine 431 is reached includes preparatory and/or interrogation steps (not shown in FIG. 2) and appertaining entry steps in order to update a statistics for the respectively relevant class. At least one inventive, query step 420 of a relevant statistics mode is executed in order to check the affiliation of data of the postage meter machine usage to at least one first class 1. When affiliation is found, a statistics set for this first class 1 is updated in step 421. Subsequently and/or otherwise, a branch is made to the next check step 422, the statistics for the next class is potentially updated or a further branch is made, etc. For simplifying the explanation, a number of possible executive sequences are explained on the basis of the specific flowcharts for the statistics mode shown in FIGS. 12a and 12b.

Figure 12A:
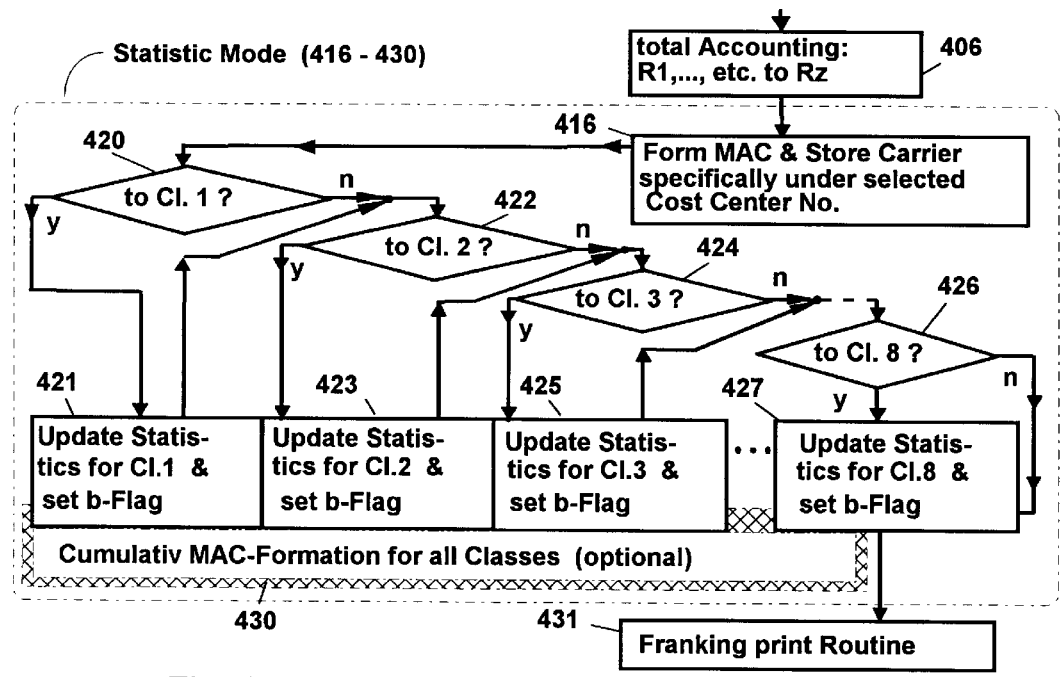
FIGS. 12a and 12b show flowcharts for the executive sequence in the statistics mode of the inventive method.

In the version shown in FIG. 12a, a securing of the accounting data of selected registers in the NVRAM of the postage meter machine by MAC formation first optionally ensues in a step 416 before the statistics mode steps. Such a securing can ensue, for example, a disclosed in German Patent Application 19534530 (corresponding to U.S. Pat. No. 5,805,711). The MAC is stored belonging to the accounting data. Carrier-specific accounting data and the appertaining MAC can be stored under the selected cost center number in the step 416. Further steps (not shown and serving, for example, for the preparation of the storage according to statistics classes (for example, mail classes)) can then be conducted before step 420 of a relevant statistics mode is reached in order to check the affiliation of data of the postage meter machine usage with a first mail class 1. The affiliation is determined by comparison of parameter values that are logically operated upon. When affiliation is found, a statistics set for this first mail class 1 is updated in step 421. Otherwise or after the updating in the register for the mail class 1, a branch is made to the next check step 422, the statistics set for the next mail class is updated if necessary or a further branch is made, etc.

This procedure is explained in greater detail on the basis of a simple exemplary embodiment. The parameter value to be debited is, for example, a postage value and amounts to exactly one currency unit (1 EURO). In the twentieth step 420, the affiliation of the postage value to be debited with a first mail class 1 is checked, this having been defined by the data center, for example for the parameter value P=1.00 EURO. A statistics set for this first mail class 1 is then updated in step 421. The previous item number z already used earlier during franking is thereby identified by the processor and is then incremented by one. For example, 20 frankings were previously counted in the mail class 1 for 1 EURO. The accumulated postage usage then corresponds to the value sum $\Sigma P1$, which is derived from the multiplication of the item number value z by the allocated, specific postage value p.pp=1 EURO.

$$\Sigma P1 = z*p.pp = 21*1.00 \text{EURO} = 21.00 \text{EURO} \tag{1}$$

The entry of the item count z=21 ensues into the register R41.pp of the non-volatile memory 5a or 5b or into an additional, specific cost center memory KST 16 (shown with broken lines) that is likewise in communication with the microprocessor of the control unit 6 and expands the non-volatile memory 5a, 5b in a suitable way.

Thus, an item count value z is now stored in an allocated manner in the register R4p.pp, namely allocated to the specific postage value p.pp=1.00 EURO. In a later remote funding, for example for the purpose of a credit reloading, the item count value (allocated to a specific postage value in this example) can then be interrogated from an arbitrary register or from all registers R4p.pp. The data center DZ or the mail carrier can statistically further evaluate these data.

In addition to the item count, the postage usage P (in currency units) can be debited in running accumulated form and can be stored in a separate register R41ΣP; this, however, is not explained further herein for simplification. In every accounting, at least the postage usage P' already debited earlier during franking is incremented by the postage value p.pp to be currently franked.

If the affiliation of the postage value to be debited with the first mail class 1 is not found in the step 420, then a branch is made to the step 422 in order to check the affiliation of the postage value to be debited with a second mail class 2. When affiliation is found in the step 422, a statistics set for this second mail class 2 is correspondingly updated in the step 423. Otherwise, a branch is made to a step 424 and a statistics set for the third mail class 3 is updated if necessary in step 425. From step 424, branches corresponding to the number of mail classes predetermined by the data center can be made to corresponding, further interrogation steps and appertaining updating steps in order to update the statistics sets corresponding to the postage value to be debited with respect to the item count z per mail class and the appertaining, cumulatively calculated postage usage P'. Dependent on the statistics instruction data and the service data acquired according to the service which has been used, a branch can be additionally made to a next interrogation step 426 and an appertaining updating step 427 even after the step 424 for the implementation of an updating of the statistics. If the inquiry in the last interrogation step (step 426 in the example of FIG. 12a) is negative, a branch is still made to the statistics updating step 427. In general, all interrogation steps thus always can be run. The statistics instruction can additionally contain the instruction (bng-flag) that the instruction is only to be carried out if the acquired service data were not already acquired in a statistics class. Such an additional instruction (bng-flag) is evaluated first according to the sub-steps of the interrogation step 4221 shown in FIG. 12b.

From the updating steps (421, 423, 425, 427 . . . ), data are optionally branched off for a securing step 430 in order to place a MAC protection over all current values z and P stored for the postage classes. A cumulative MAC formation, for example the known CB(C mode (cipher block chaining), can be advantageously utilized. This is a continuation of an early MAC formation, possibly beginning in the step 416, that always proceeds farther while the steps in the statistics mode are being run and selected intermediate results from the statistics mode are incorporated into the MAC formation. A DES encryption of data covering the data formed by an XOR operation of previous data with current data can ensue in every securing step allocated to an updating step. The previous data were formed in the previous securing step with likewise previously operated data which were DES encrypted in the preceding updating step. The cumulative MAC formation thus proceeds in parallel in the securing step 430 until the MAC formation over all classes has ended. This version allows, that a memory 16 can be a physically non-protected memory without a security housing. The memory 16 is separate arranged from the non-volatile main memories 5a, 5b which store the register account. Following thereupon, the step 431 of the franking print routine is implemented and the point t of the system routine (FIG. 2) is again reached via a branch return.

Given the absence of a print request, however, a branch is made, according to the flowchart shown in FIG. 2, back from step 405 of the franking mode 400 to the point t of the system routine and an input according to the sub-steps of the input/display routine 209 for data change is interrogated. A communication request can be made at any time or some other input according to the modes for test request, register check and the like following step 300 can be actuated.

Figure 12B:
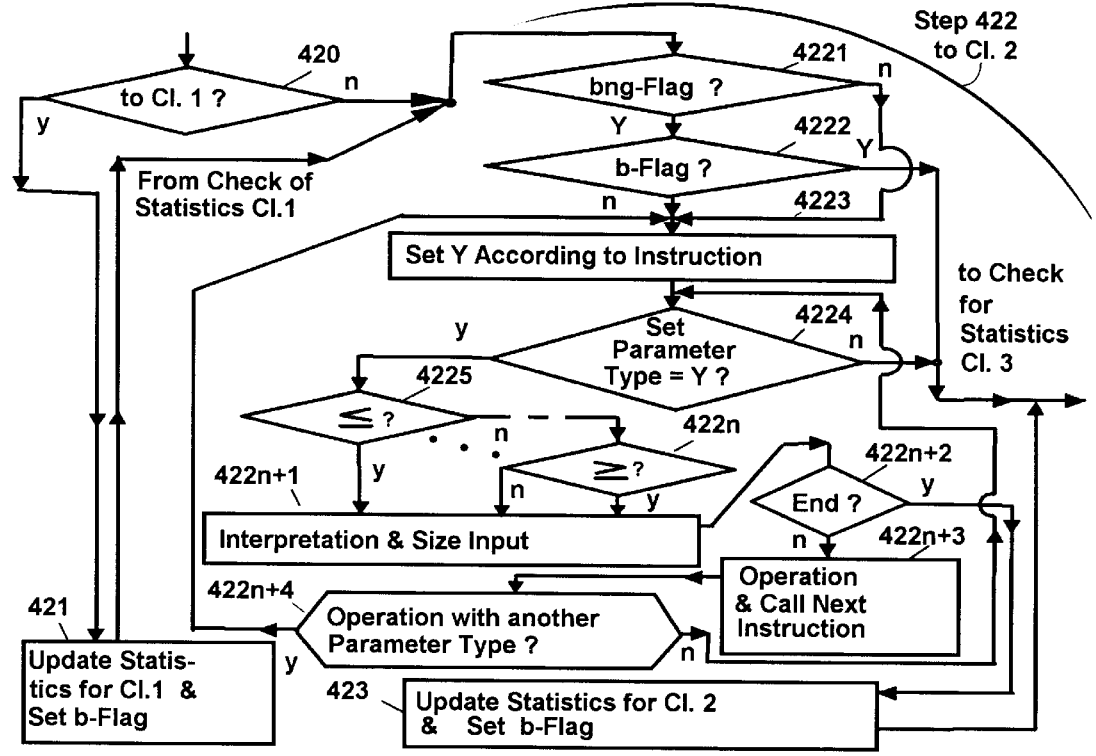

Further services for which separate service modes are respectively provided are conceivable, but are shown in FIG. 2 for clarity. Every service mode likewise has a statistics mode for the acquisition of statistical data. Such a statistics mode comprises a comparable sequence of steps as shown in FIGS. 12a, 12b.

The inventive possibility of obtaining correspondingly freely definable instructions for the accounting and the statistics mode from the data center requires a modem/telephone network or some other suitable transmission means (chip card, GSM mobile radiotelephone network) as basically explained in European Application 566 225 A2, but which is now expanded for the aforementioned statistics instructions. The means for the reception of the instructions are the modem 23 or the input unit 21 (FIG. 1a). The aforementioned instructions explained with reference to FIG. 11 are communicated to the postage meter machine, particularly as needed or additionally when a predetermined time interval has passed. Given the preferred versions of modem/telephone network, ISDN or GSM mobile radiotelephone network (global system for mobile communications), no outlay or longer delays whatsoever in the operation of the postage meter machine occur for the postage meter machine user.

An additional interrogation step 349 as to whether a time interval criterion has been met is interrogated is implemented in the system routine 200. If a predetermined time interval for a number of has elapsed, an automatic branch is made from step 349 to the point g. A branch is now made into a communication mode that enables a communication with the same data center that also allows the credit reloading. In an alternative version, a communication can also be enabled with another data center that offers the service of statistics mode reloading. In all versions, the interrogation step 349 according to the flowchart shown in FIG. 2 is reached from the step 405 of the franking mode 400 given the absence of a print request.

In the preferred version shown in FIG. 2, a branch is made from the interrogation step 349 into a second communication mode 350 so that a new, valid, predetermined instruction is communicated from the data center. This, for example, can instruct the entering of the values z and p in the aforementioned way or can be directed to a completely different data acquisition. The communication of such instructions is referred to below as statistics mode reloading. Subsequently, the point t of the system routine 200 is again reached. Otherwise, if the time interval has not yet W elapsed, a branch is likewise made from the step 349 to point t of the system routine 200.

Alternatively, a branching to the first communication mode I instead of to the second communication mode II is provided in a further version (not shown). A flag F is thereby set in a step replacing the step 350 and a branch is then made to the point t of the system routine 200. After running the input/display routine 209, the flag F is interpreted as a transaction request in the interrogation step 301. The communication with the data center with a number of transactions is then implemented in the communication mode 300. The first transaction is referred to as a zero remote valuation, i.e. the valuation request is stored as zero. No credit, or merely a credit having the value zero, and the requested instruction for data acquisition are thus reloaded. The difference between the preferred second communication mode and the first communication mode 300 is in the automatic procedure in the communication of the parameters to the data center and the lower number of transactions during the communication in the second communication mode 350 due to the lack of the first two transactions for the valuation request and the valuation value. The aforementioned second communication mode 350 is explained below with reference to the flowchart shown in FIG. 9. The first communication mode 300 will additionally comprise the very same steps if a statistics mode reloading ensues following a credit reloading from the same data center. The communication in the second communication mode (II) 350, however, is correspondingly separately fashioned precisely in order to prevent the previous valuation request from being overwritten, or to prevent a value of zero from being set. Since the previous valuation request is retained, the unmodified, previous valuation request can be accessed following the change to the regular communication in the first communication mode 300. A renewed manual input of the valuation request is thus advantageously eliminated if no modification is necessary.

The first communication mode 300 is explained later on the basis of the flowchart shown in FIG. 3. Parameters can be manually entered in the first communication mode 300 in order, for example, to store a credit with variable size in the postage meter machine as the valuation. Transaction data can be interrogated with respect to their transmission in a step 211 shown in FIG. 5 following the first communication mode 300. A statistics instruction and error evaluation also is implemented in the step 213 in order to acquire further current data that can likewise be fetched after branching to the system routine 200 in the step 201.

If no inputs were actuated and not communicated or if data were automatically changed, the steps 401 through 404 shown in FIG. 2 are executed in the franking mode 400. Given a predetermined number of loops, a branch is made from the step 404 to the step 408. This occurrence or an alternative interrogation criterion can be interrogated in the step 404 in order to set a standby flag in the step 408 if a print request is still not present after a predetermined time. As already explained above, the standby flag can be interrogated in the step 211 (shown in FIG. 5) following the communication mode 300. Thus, a branch is not made to the franking mode 400 before the checksum check has not shown the full complement of all programs or at least selected programs.

FIG. 3 shows a flowchart for the first communication mode I. When the point e is reached, i.e. the beginning of the communication mode 300 explained below, a query is made in the step 301 as to whether a transaction request is present. Such a request can have been made or found in a preceding step, for example for reloading credit and item count or statistics mode or for updating other relevant data. For the purpose of credit reloading, for example, the user selects the communication mode of the postage meter machine by the entry of the eight-place postage call identification number (PIN) and by the actuation of a predetermined key, for example the T-key. When the desired input parameter is correctly displayed, this is confirmed by renewed actuation of the aforementioned key or a second predetermined key of the input unit 2. As needed, the input parameter is edited by an actuated, further X or R or C key (step 302). A presentation corresponding to the input then appears in the display unit 3. The transmission of the input parameter via the modem connection is started and the input is checked by the actuation of a predetermined key (T-key). The rest of the procedure sequences automatically, with the execution being accompanied by a corresponding display.

A transaction counter T is set to zero by the microprocessor in the control unit 6 in step 302 and a predetermined, maximum number of transactions is automatically entered into a register for storage, with reference to which the transaction which is to be currently implemented (in the step 380) can be identified even given interruptions of the communication connection to the data center, or the end of the last transaction can be identified (in the step 306). In step 302, the microprocessor of the control unit 6 can additionally implement an automatic modem type recognition, as disclosed in German Patent Application 19543075 (corresponding to U.S. Pat. No. 5,926,506).

In step 302, the microprocessor of the control unit 6 then checks the postage meter machine to determine whether a modem is connected and operational. If this is not the case, a branch is made to the step 310 for status display in order to display that the transaction request must be repeated. In a step 303, the entered PIN and other input parameters can be checked for freedom for error. If an error is found, a branch is made to the step 310 for status display.

Otherwise, the postage meter machine reads the selection parameters, composed of the select parameters (main/extension, etc.) and of the telephone number from an NVRAM memory area and sends these together with a selection request command to the modem 23. A corresponding automatic dialing and the connection setup to the data center via the modem 23 required for the communication to subsequently ensue in step 304. The correct connection setup is checked in the interrogation step 305 and a branch is then made to the interrogation step 306, in which the microprocessor of the control unit 6 determines whether the transaction counter reading T is lower than the predetermined, maximum number of transactions. When this is the case, a branch is made to the step 380. Otherwise, if the microprocessor of the control unit 6 finds an interruption of the communication connection to the data center in the interrogation step 305, a branch is made to the interrogation step 370. The microprocessor 6 initiates a re-dialing and checks in the interrogation step 370 whether an $n^{th}$ re-dialing was already undertaken. When this is the case, i.e. following a predetermined number n of unsuccessful re-dialings for attempting a connection setup, a branch is made back to the point e via an error routine 361 and a display step 310.

Otherwise, after re-dialing and successful connection setup to the data center via the modem 23, a branch via the interrogation step given a proper connection setup is made to the step 380 via the interrogation step 306, if there is at least one transaction yet to be undertaken. Otherwise, when the microprocessor of the control unit 6 finds that the transaction counter reading T is not lower than the predetermined maximum number of transactions, no further transactions are required. In this case, a branch is made to a step 362 for resetting the transaction request. An E-flag for a transaction request that is recognized in the step 301 can be set preferably in the input and display routine 209. After branching via the status display in the step 310, a resetting of the E-flag in the step 362 then leads to the unsuccessful interrogation of a transaction request (E-flag) in the step 301. The point b (operating mode for further inquiries) is thus reached.

In step 380 a transaction is implemented with encoded messages during the communication, which comprises a prescription value for a credit reloading value that the remote data center communicates, and another transaction is implemented during the communication with encoded messages, which comprises corresponding data for a statistics mode reloading.

Relevant keys (crypto keys) that have been stored in the memory in encrypted form are required for the communication of the data required for a credit and/or statistics mode reloading. The principles of this security measure as described in German Patent Application 19534530 (corresponding to U.S. Pat. No. 5,805,711). The DES algorithm and a secret remote valuation DES key $KK_{Fix}$ cannot be read out of the OTP and thus cannot be discovered by a person attempting tampering. For securing the DES key $K_{Fix}$ required for the remote a valuation against manipulation, an input encoding with the secret remote valuation DES key $KK_{Fix}$ ensues before it is stored in the NVRAM 5a with the encrypted key Crypt $K_{Fix}$. An application of the DES algorithm and on the keys required for the remote valuation thereby preferably ensues in order to be able to deposit these non-volatilely in the NVRAM 5a in encrypted form.

Figure 4:
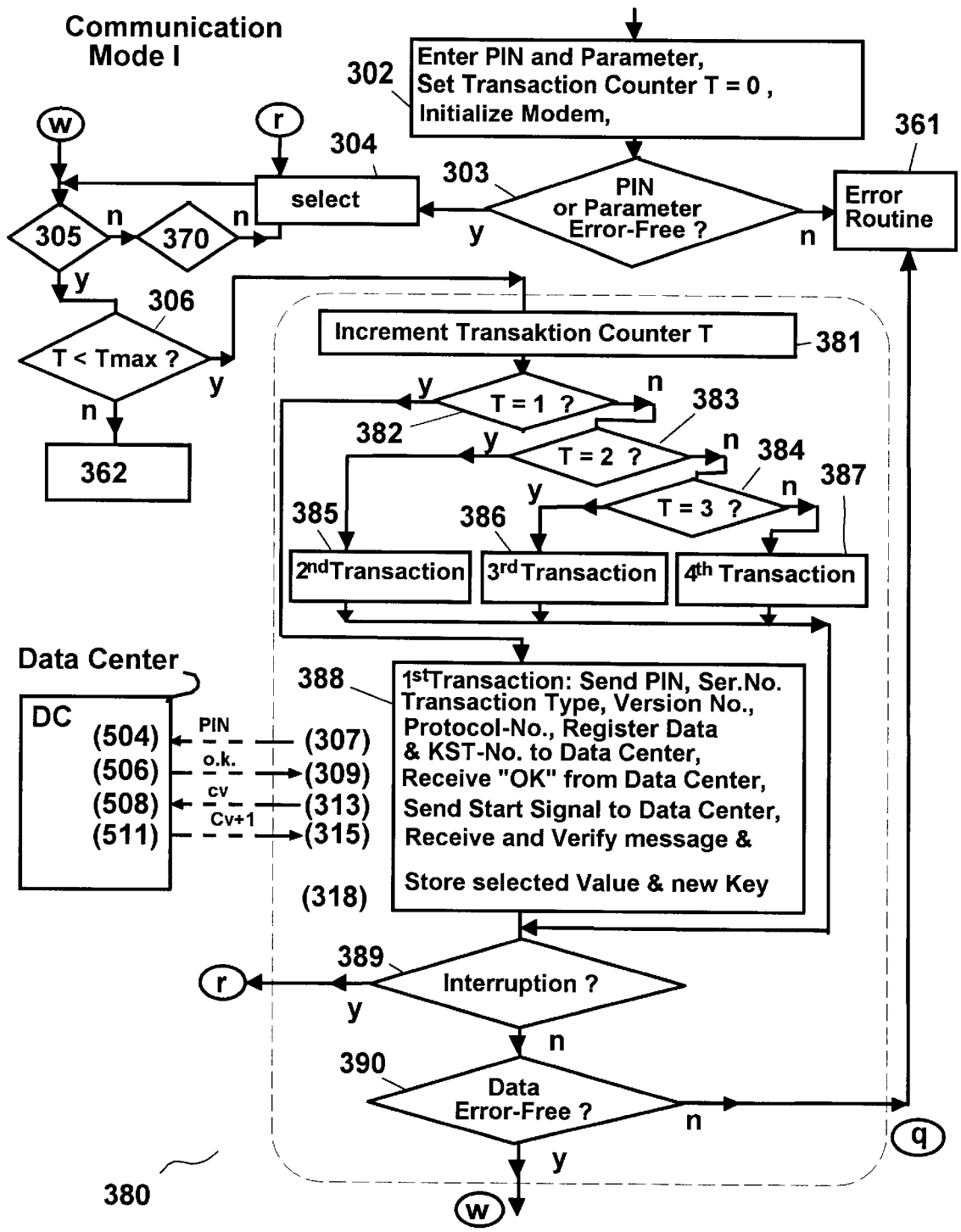
FIGS. 4 and 5 illustrate transactions in the first communication mode I of the inventive method.

FIGS. 4 and 5 show further details of the first communication mode I. FIG. 4 explains the step 380 for the communication with the data center that is reached after the successful execution of the steps 302 through 306 that prepare a transaction. The transaction counter is incremented by one in the step 381 so that T=1. This status is determined in the following step 382 and a branch is made to a step 388 for the implementation of the first transaction.

The steps required for two successively sequencing transactions for a specific communication mode are disclosed in German OS 44 46 667. For the implementation of the first transaction, the transaction type according to the status of the transaction counter is transmitted (step 307) unencrypted from the postage meter machine to the data center in addition to the PIN and other data. The other data are stored in the postage meter machine as a register entry or are entered during the input and display routine 209. A further register entry relates to the protocol number and another to the number of transactions to be transmitted.

The data central DZ dialed by the postage meter machine FM by modem receives the data and checks the PIN (step 504). The data control DZ reads the register entries, the transaction type and the protocol number. One register entry relates to a message of the FM user to the data center DZ. The message of the FM user to the data center DZ preferably relates to the wish for a predetermined service. Corresponding to the protocol number, the data center DZ can determine whether the FM is an old or a new type. As requested, a communication with a number of transactions is now implemented. The data center first sends (step 506) an ok message to the postage meter machine. After reception in the postage meter machine (step 309), the secret current keys KAct required for the remote valuation are OTP-internally generated and are intermediately stored in the OTP for the transaction. The generation ensues with the aforementioned secret remote valuation DES key $KK_{Fix}$ in order to be able to de-encrypt the keys stored non-volatilely in the NVRAM 5a in encrypted form to form a secret current key KAct. The postage meter machine encrypts a message v with the OTP-internally stored, secret current key KAct to form an encrypted message cv, by employing the DES algorithm. The encrypted message cv generated with the secret current key KAct is then sent from the postage meter machine to the data center (step 313).

The data center receives (step 508) encrypted message cv and forms a new secret key. The data center DZ forms (step 511) an encrypted message Cv+1 with the same secret current key KAct, this encrypted message Cv+1 also containing the new, we secret current key and further transaction data, and sends this encrypted message Up Cv+1 to the postage meter machine. The postage meter machine receives (step 315) the encrypted message Cv+1 and extracts the PIN (postage call identification number) and the new, secret current key from the encrypted message Cv+1 by deciphering with the secret current key KAct. A verification of the message is possible on the basis of the PIN. The transaction data include the fund value and the customer account data as well as instructions for the statistics mode. Storage (in step 318) of the transaction data and of the new, secret current key ensue after the verification of the message. The latter is encrypted again upon application of the DES algorithm and using the secret remote valuation DES key $KK_{Fix}$ from the OTP in order also to be able to store the new, secret current key KAct+1 non-volatilely in the NVRAM 5a in encrypted form as crypto KAct+1.

During the first transaction (step 388), a check (not shown) for interruption of the communication connection is made and a check (not shown) for error-free data is also made. The result of the checks is subsequently interrogated at the first transaction step 388 in separate interrogation steps 389 and 390. The check for error-free data can be implemented as disclosed in German OS 44 46 667.

A branch to the point r ensues when an interruption of the communication connection to the data center is found in the interrogation step 389. From the interrogation step 389, a branch is made back to the step 304 for the implementation of re-dialings for setting up a connection.

A branch to the point q ensues if error-affected data are found in the check in the interrogation step 390. An analysis of the error subsequently occurs in an error routine (step 361) before a branch is made to the status display (FIG. 3).

Otherwise, if the first transaction was capable of being successfully implemented (point w), a branch is first made back to the step 305 before the implementation of further transactions in order to check whether to maintain the communication connection to the data center. When this is ok, a branch is again made to the step 380 via the interrogation step 306. The transaction counter is again incremented by one in the step 381 so that T=2. A determination is made in the following step 382 that the status is not T=1 and a branch is made to the step 383 in which a determination is made that the status is T=2. If so, a branch is made to a step 385 for the implementation of the second transaction. If the status is not T=2, then a branch is made to step 384. In step 384, if the status is T=3 a branch is made to step 386 for implementation of the third transaction. If the status is not T=3 in step 384, a branch is made to step 387 to implement the fourth transaction.

FIG. 5 shows the details of the first communication mode 300 for another three transactions. The second transaction is implemented (step 385) with the new, secret current key KAct+1, sequencing like the first transaction and leading to the confirmation of the prescription value. Only then has the credit reloading been concluded. The steps 607, 608, 613, 615 and 618 (not explained in detail in FIG. 5) that sequence in the postage meter machine as well as the steps 704, 706, 708 and 711 (not explained in detail in FIG. 5) that sequence in the data center are implemented as disclosed in German OS 44 46 667 (corresponding to co-pending U.S. application Ser. No. 08/955,072 filed Oct. 21, 1997, the teachings of which one incorporated herein by reference).

Figure 9:
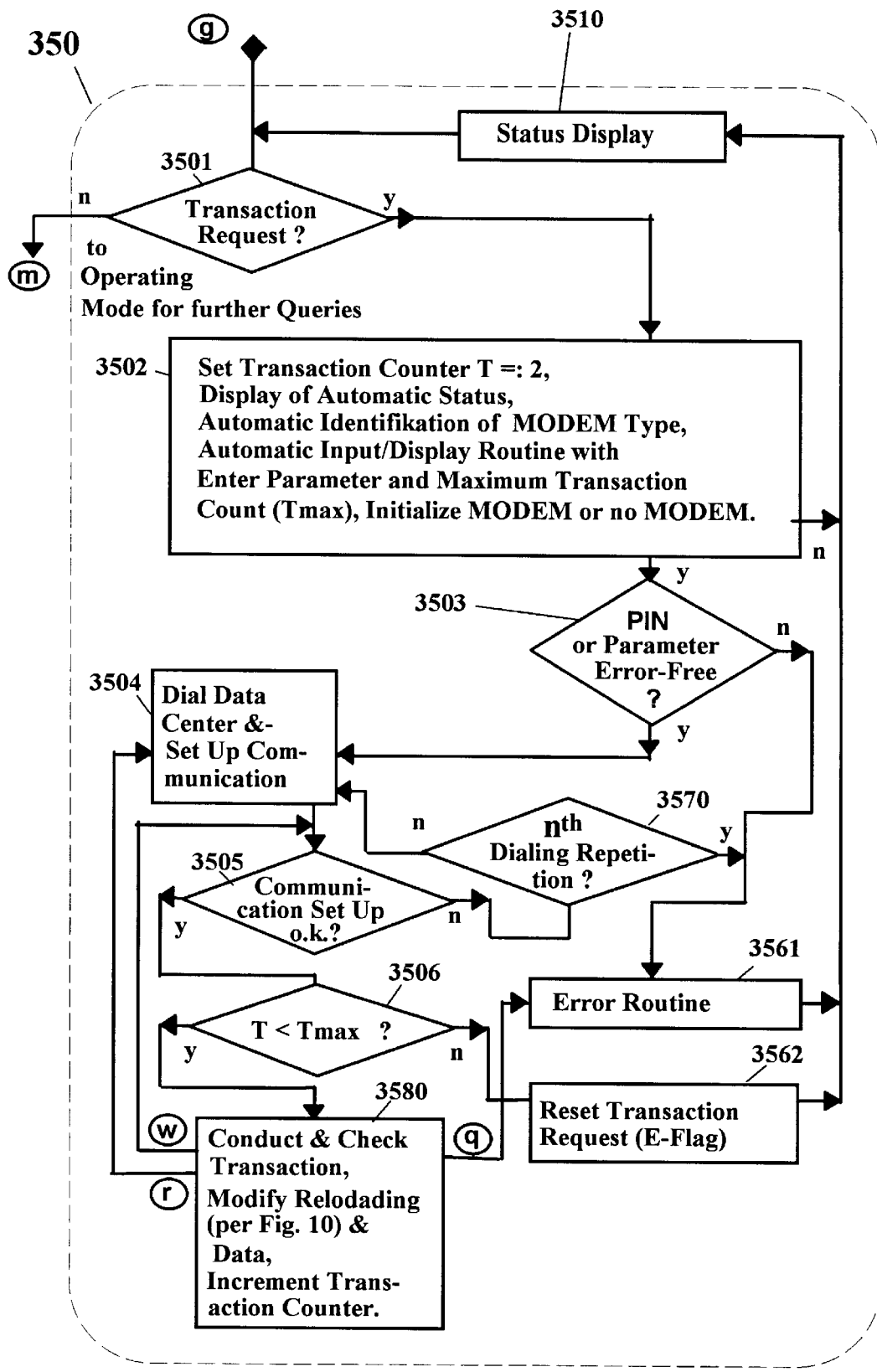
FIG. 9 is a flowchart for the second communication mode II of the inventive method.

Further transactions are provided in order to transmit data of the statistics mode and statistics instruction data, or in order to delete the old statistics. The steps 907, 908, 913, 915 and 918 and the steps 1207, 1208, 1213, 1215 and 1218 (not explained in detail in FIG. 5) that sequence in the postage meter machine, as well as the steps 1004, 1006, 1008 and 1011 and the steps 1304, 1306, 1308 and 1311 (not explained in detail in FIG. 5) that sequence at the data center DC are implemented as set forth in the third and fourth transactions, which are explained in detail in connection with FIG. 10. A secret current key exists for every transaction, this having been communicated from the data center to the postage meter machine in the preceding transaction. Differing from the known credit reloading, four transaction in the first communication mode 300 or two transactions in the second communication mode 350 are now provided, these sequencing like the two last transactions of the first communication mode 300. These two transactions shall be explained in greater detail on the basis of the sub-steps of the second communication mode II (step 350) that is shown in FIG. 9. The first and second transaction are omitted in the second communication mode II. Differing from the sub-step 302 of the step 300 of the first communication mode I (FIG. 3), the transaction counter is automatically set to T=2 in the sub-step 3502 and four transactions are entered as the maximum number. For the purpose of dialing and connection setup to a different data central, it is also possible that a different telephone number is accessed in the sub-step 3504. The majority of the other steps 3501, 3503, 3505, 3570, 3506, 3561, 3562, 3580 and 3510 correspond to the steps 301, 303, 305, 370, 306, 361, 362, 380 and 310 that were already explained in conjunction with FIG. 3.

Figure 10:
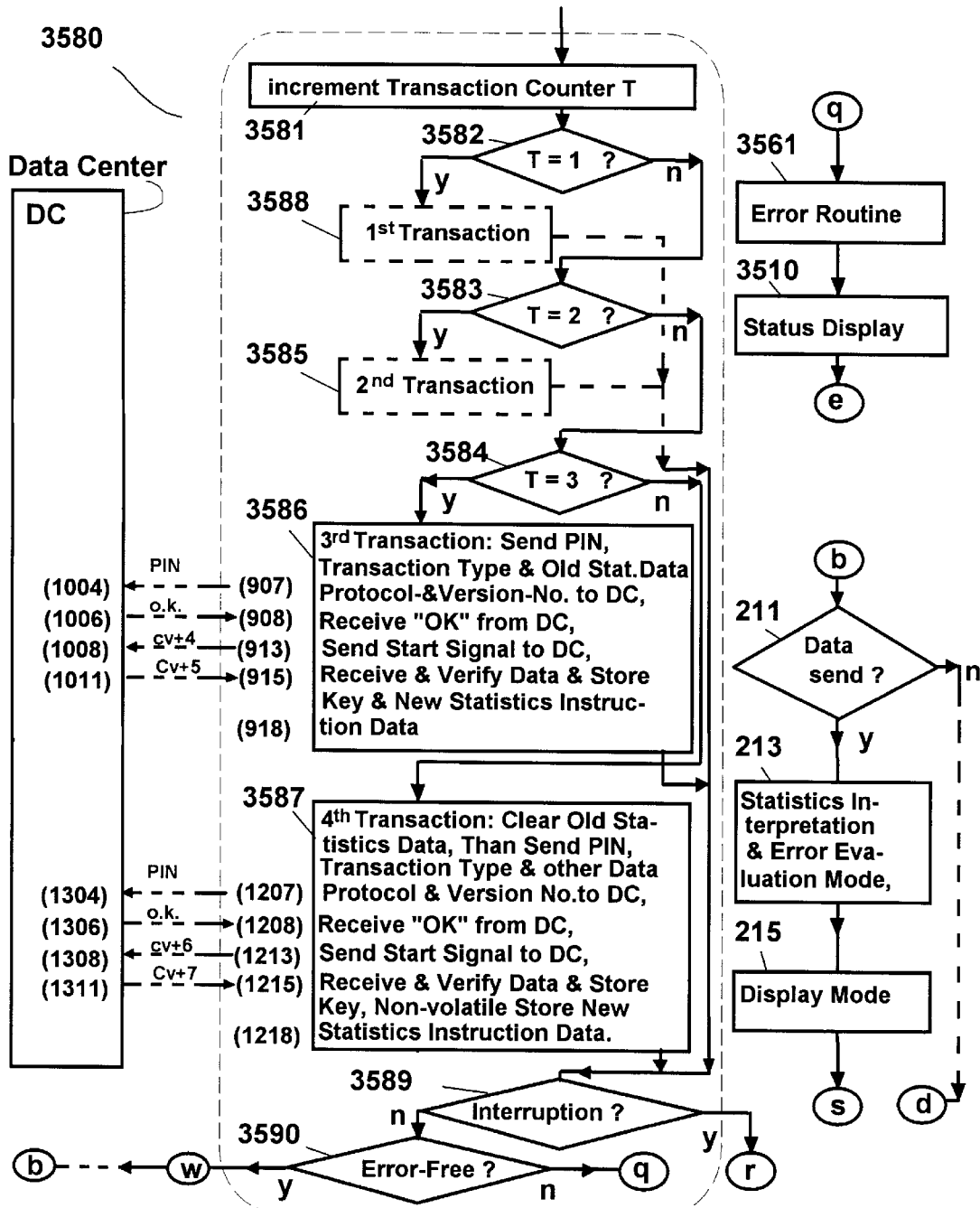
FIG. 10 illustrates transactions in the second communication mode II of the inventive method.

As noted above, details of the two further transactions are shown in FIG. 10. The processor of the postage meter machine skips the first and second transaction steps 3588 and 2585 given a negative inquiry result in each of interrogation steps 3582 and 3583, and, because of the pre-setting that was undertaken and given a positive inquiry result in interrogation step 3584, begins with the third transaction (step 3586). In the sub-step 907, the version number NR of the stored statistics instructions is communicated, among other things, from the postage meter machine to the data center. The data center sends an ok message and then generates instruction datasets, among other things in the form shown in FIG. 11 for communication to the postage meter machine. In sub-step 915, the postage meter machine receives transaction data that include the new statistics instruction data. These are verified and stored in the main memory RAM. The steps of the third transaction (step 3586) in the second communication mode II and those of the third transaction (step 386) in the first communication mode I fundamentally sequence identically.

After the third transaction (step 3586), during which a check for freedom from error of the communicated data also occurs in the way set forth above, an interrogation step 3589 and an interrogation step 3590 are again reached, these fundamentally corresponding to the interrogation steps 389 and 390 (FIG. 4) of the first communication mode I. The steps 1004, 1006, 1008 and 1011, which are mentioned in FIGS. 5 and 10 but not explained in greater detail and which sequence in the data center, are implemented in a way similar to that already explained for previous transactions. During the fourth transaction (step 3587) the steps 1207, 1208, 1213, 1215, 1218 are executed in the postage meter machine and the appertaining steps 1304, 1306, 1308, 1301 in the data center likewise sequence in a comparable way for FIGS. 5 and 10. Among other things, the version number NR of the new statistics instructions intermediately stored in the meantime is also communicated from the postage meter machine to the data center for monitoring purposes. In the sub-step 1215, transaction data are received by the postage meter machine for acknowledgment that the new statistics instruction data can now be non-volatilely stored in the areas 16-03 of the cost memory 16.

The postage meter machine contains a microprocessor that is programmed for the formation of a checksum that is communicated to the data center for the purpose of checking the transmitted, new statistics instruction data received by the postage meter machine. The deletion of the old statistics instruction data is implemented by the microprocessor of the postage meter machine after a check of the transmitted, new statistics instruction data for the formation of a new statistics mode. This check entails volatile intermediate storage of the transmitted, new statistics instruction data and a formation of a checksum over the content thereof, a transmission of a checksum value that has been formed to the data center during a further transaction, and a comparison of the communicated checksum value to a predetermined checksum value for the transmitted, new statistics instruction data in the data center, as well as communication of the result of the comparison to the postage meter machine during the further transaction in the communication mode 300 or 350 and implementation of a non-volatile storage of transmitted, new statistics instruction data in a memory of the postage meter machine when equality is found in the data center, with an error message given inequality.

The volatile intermediate storage ensues in the postage meter machine only given proper transmission, i.e. only when the appertaining, predetermined postage meter machine has received the instruction data error-free. In view of the steps shown in FIGS. 5 or 10, the volatile intermediate storage of the transmitted, new statistics instruction data in a step 918 ensues dependent on a communicated PIN only when the postage meter machine receives an encrypted message in the step 915 that contains the new statistics instruction data and the PIN of the postage meter machine, when the postage meter machine then deciphers and checks the encrypted message as well as when the PIN is found correct as a result.

Subsequently, a check of a checksum is implemented in the data center before the instruction data intermediately stored in the postage meter machine are considered valid The postage meter machine sends the version number and a checksum to the data center, which allows the transmitted, new statistics instruction data to be unambiguously identified in the data center.

Given an RSA signature (R. Rivest, A. Shamir, L. Adelman) which includes, for example, the digital signature algorithm (DSA) according to U.S. Pat. No. 5,231,668, a message based on the version number and the checksum is encrypted with a write key to form a digital signature. The digital signature is sent to the data center, which can decipher the digital signature with a read key. The checksum over the content of the instruction data must agree with the deciphered message if the instruction data intermediately stored in the postage meter machine are to be deemed valid, in order to communicate a corresponding command to the postage meter machine.

The check in the data center can alternatively ensue with an MAC. Given a MAC formation, the same secret key is employed in the data center and in the postage meter machine.

The microprocessor of the postage meter machine is, for example, am OTP type that contains the algorithm for the formation of a checksum and for the encryption thereof stored in its internal program memory. It is programmed such that the formation of a checksum in the OTP processor over the content of the transmitted, new statistics instruction data, an encryption of the checksum to an encrypted message and a volatile intermediate storage in the internal main memory OTP-RAM of the OTP processor ensue before the encrypted message with the internally formed checksum value is transmitted to the data center in the step 1207 during a further transaction.

The data center deciphers the encrypted message and separates and checks the checksum value, and given equality with a predetermined checksum value identified in the data center and after communication of the comparison result to the postage meter machine in the step 1215 of the further transaction, the non-volatile storage of the transmitted, new statistics instruction data in a memory 5a, 5b, 16 of the postage meter machine is implemented by the OTP processor in the step 1218.

Figure 6:
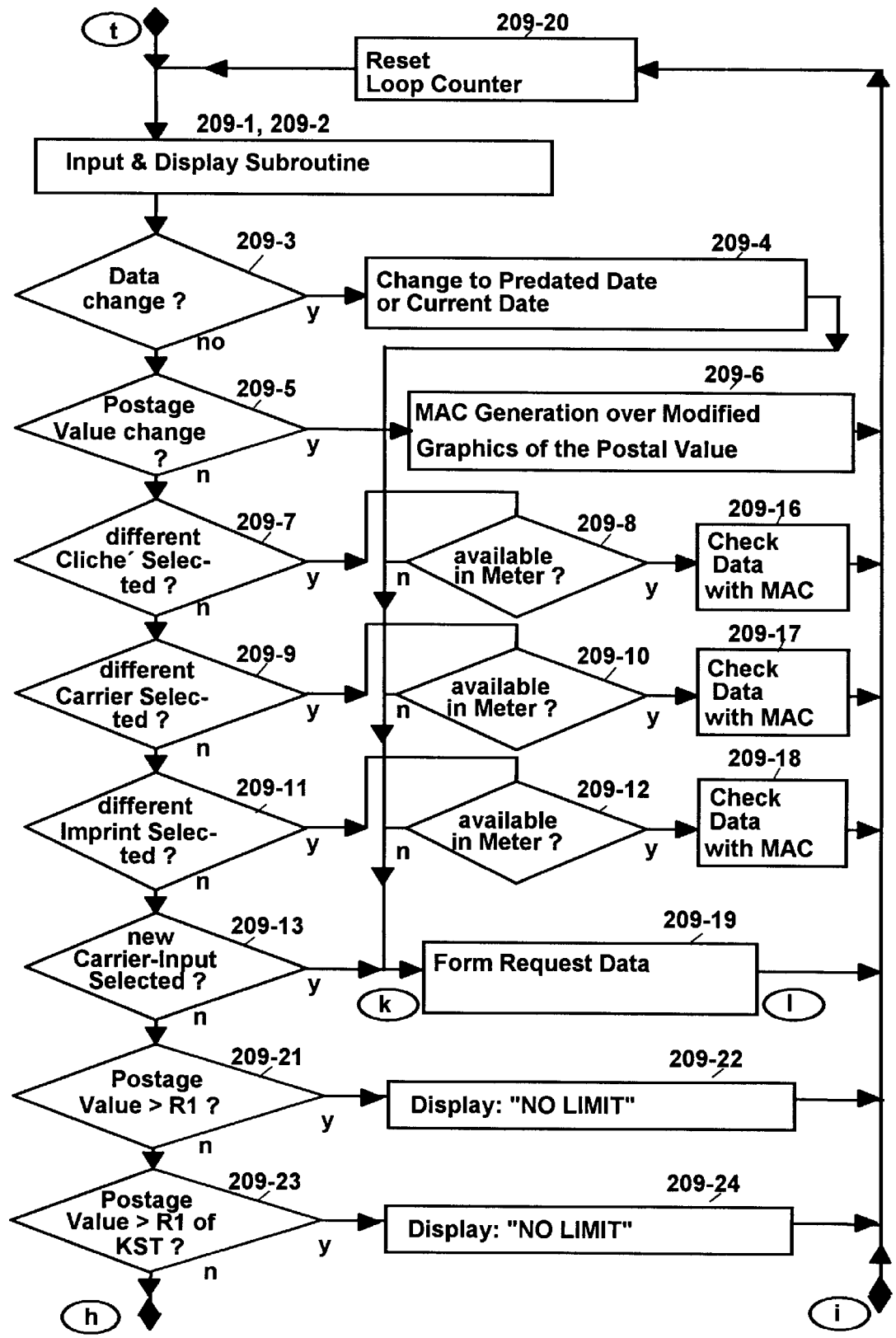
FIGS. 6,7 and 8 show details of the input and display routine with interrogations of the inventive method.

FIG. 6 shows a flowchart with securing of security-relevant data in a freely accessible memory in an electronic postage meter machine. An input for the modification of window data ensues in the step 209-1. The input is displayed in the step 209-2, and a branch is then made to a first check step 209-3 of a number of check steps 209-3 through 209-12. For example, print data of the value stamp and other data such as, for example, location of the sender, postal zip code of the sender, etc., that are to be protected against manipulation are also located in the external program memory (EPROM). This is disclosed in German Patent Application 19534530 (corresponding to U.S. Pat. No. 5,805,711).

The check steps allow a branching to one of the steps 209-4 through 209-11 when some other value, selective print (services), slogans or other data were selected in the input. If data for a mail carrier are available in the postage meter machine, then a branch is made from steps 209-8, 209-10 and 209-12 to steps 209-16, 209-17 and 209-18 and a MAC is then formed over the content to be checked in areas of the EPROM and is compared to the stored MAC. If the formed MAC matches the stored MAC, a branch is made via a step 209-20 for resetting the loop counter back to the step 209-1. If appertaining data for a mail carrier are not available in the postage meter machine, this is determined in interrogation steps (sub-steps 209-8, 209-10, 209-12) and a branch is made to a point k in order to automatically form request data. Given, for example, a connected scale, the request data can be formed as disclosed in European Application 724 141, in step 126 in FIG. 12). The request data are stored in a register in order to be able to send them to the data center later during a communication. After the formation of request data (point l), the point t of the system routine is again reached via the sub-step 209-20. A keyboard interrogation and display ensues again in sub-steps 209-1, 209-2. When all following check steps 209-3 through 209-13 have been executed without change or selection of a new value or data, then a new interrogation step 209-21 is reached in order to check whether the postage value to be printed is greater than the remaining credit stored in the postage meter machine. In this case, there is no adequate coverage and a franking thus cannot ensue, which is indicated in the sub-step 209-22 with the display "NO LIMIT". Otherwise, a further interrogation step 209-23 is reached in order to check whether the postage value to be printed is greater than the remaining credit specifically stored in the postage meter machine for a selected cost center. In this case, there is likewise no adequate coverage and a franking thus cannot ensue, which is indicated in the sub-step 209-24 with the display "NO LIMIT" or with a special display. The point e is reached again in step 209 after executing all interrogation steps 209-3 to 209-50.

Figure 7:
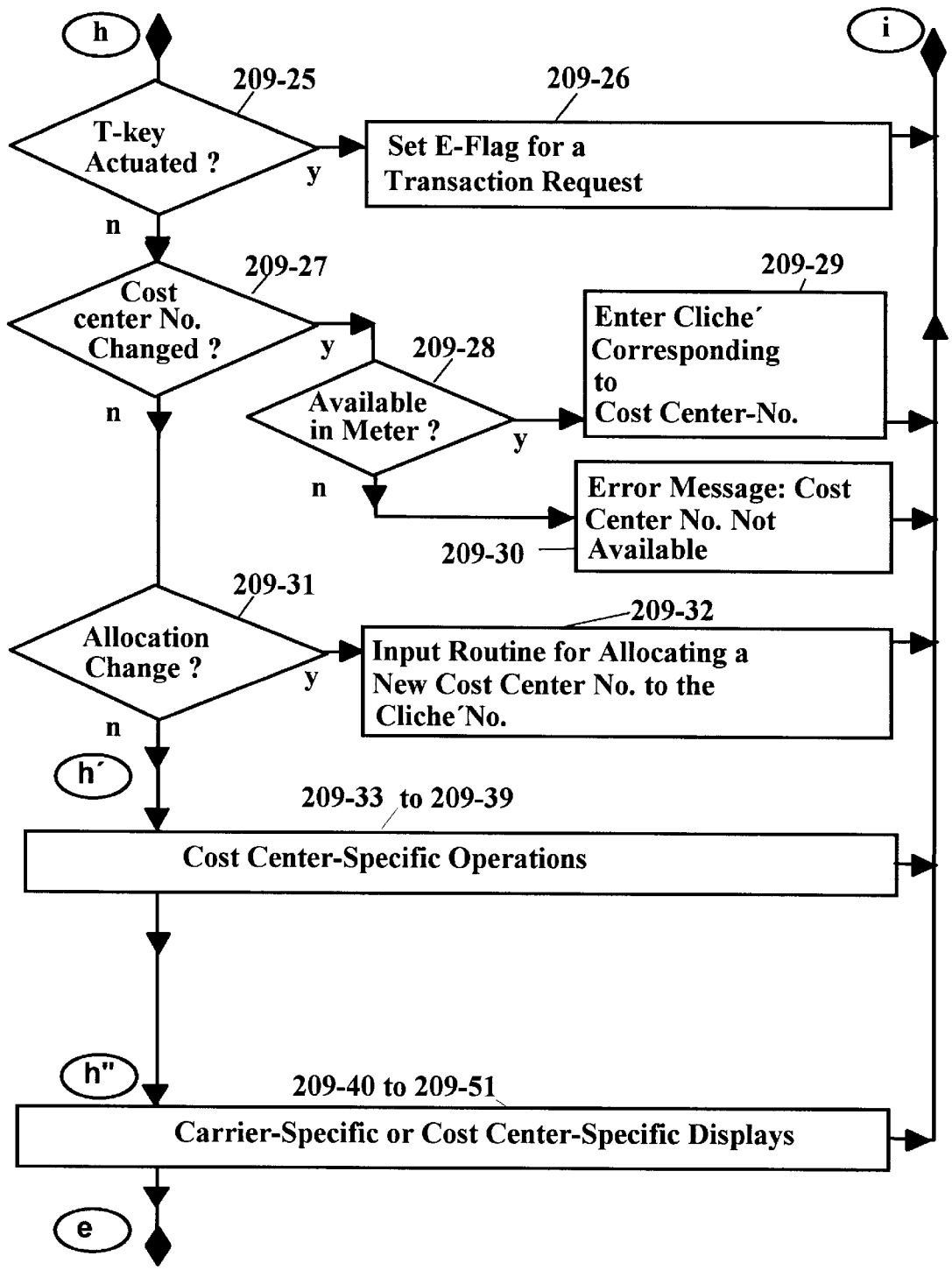
Figure 8:
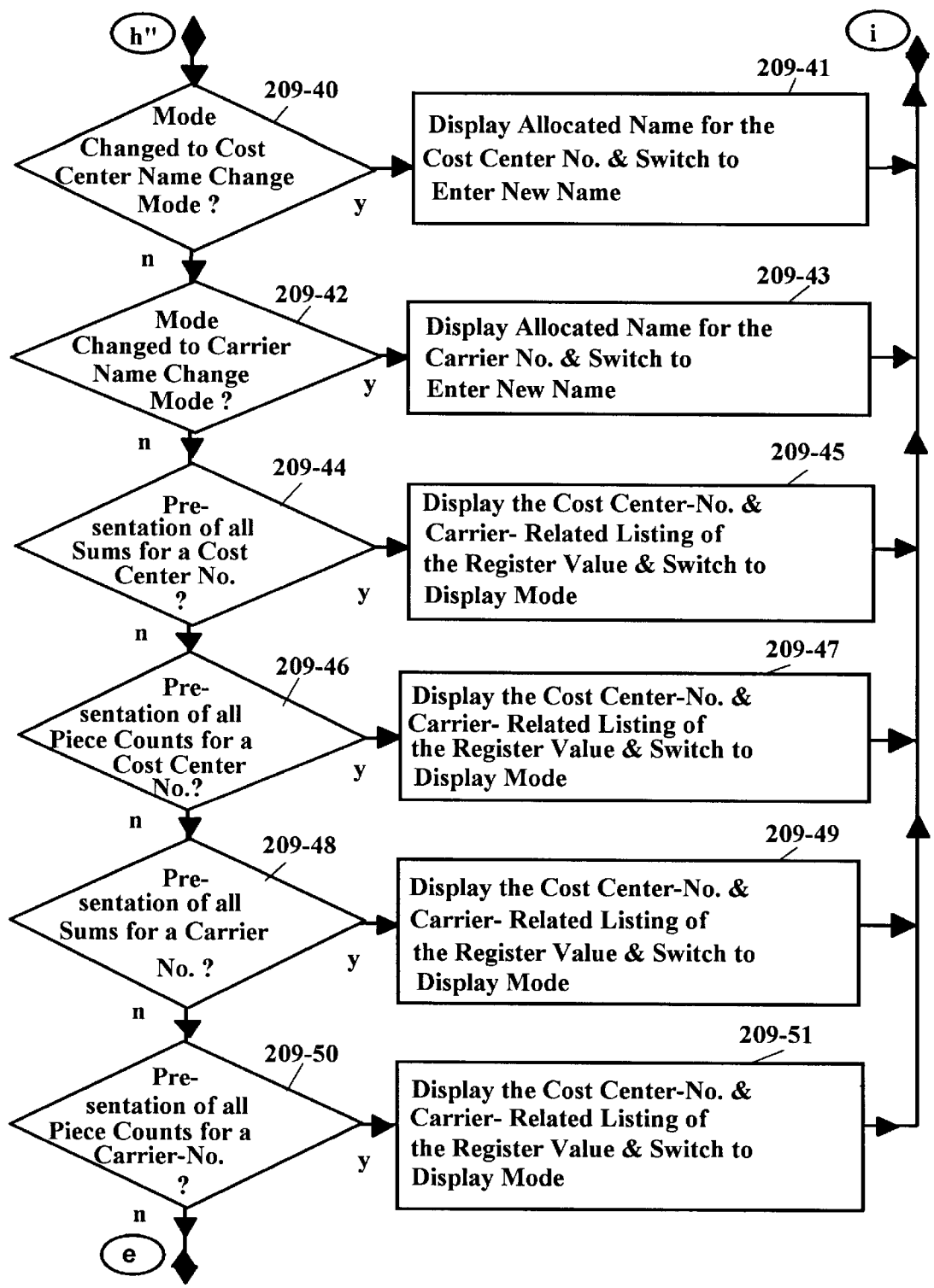

FIGS. 7 and 8 show further details of the input and display routine with inquiries about modified input data and corresponding data processing or display. FIG. 7 shows a keyboard interrogation step 209-25 with branch for setting an E-flag (in sub-step 209-26) for a transaction request by the user of the postage meter machine. A further interrogation step 209-27 (if the inquiry result was negative in the interrogation step 209-25) relates to a keyboard interrogation for input or a corresponding keyboard actuation for changing the cost center number. In this case, the accounting and franking should ensue specifically for the selected cost center. First, however, a check is carried out to determine if the selected cost center number is available in the postage meter machine (sub-step 209-28). Given availability, an allocated advertising slogan is automatically entered into the postage meter machine according to the cost center number in sub-step 209-29. Otherwise, an error message ensues (sub-step 209-30).

A further interrogation step 209-31 (if the inquiry result was negative in interrogation step 209-27 relates to a keyboard interrogation for an input or a corresponding key actuation for changing the allocation of the cost center number to the advertising slogan number. The allocation then ensues in a following input routine in sub-step 209-32. This interrogation is also required when the cost center is to be entered with its real name (sub-steps 209-40, 209-41 in FIG. 8) instead of by means of an allocated number.

Given the steps explained in FIGS. 5 and 10, the postage call identification number (PIN) differing from postage meter machine to postage meter machine, the transaction type and the data of interest are always respectively called by the data center during the course of transactions before new transaction data are sent from the date center to the postage meter machine and received thereat. Only data whose type and form of acquisition are defined are transmitted to the data center, and additional data that were already pre-selected in an earlier communication, or that were pre-determined, are transmitted. The pre-selection or determination of the conditions ensues with at least one first parameter.

Given such a call, the postage meter machine FM can communicate register values Ri (i=1,2,3, . . . ,) to the data center DZ, preferably before a credit reloading:

R1 (descending register) remaining amount on hand in the postage meter machine,

R2 (ascending register) used aggregate amount in the postage meter machine,

R3 (total resetting) the previous overall valuation sum of all remote valuations, with R3=R2+R1, R4 (piece count Σprinting with value 0) number of valid printings.

A number of further pre-selectedly requested datasets can follow and comprises, for example:

R41.00 (piece count Σprinting with value=1.00 EURO) number of postage value,

R42.00 (piece count Σprinting with value=2.00 EURO) number of postage values,

R4p.pp (piece count Σprinting with value=p.pp EURO) number of postage values, etc., until, for example:

R8 (R4+piece count Σprinting with value=0) number of all printings.

These aforementioned datasets and every further dataset are predetermined by a further, separate parameter. A piece count value z allocated to a specific postage value p.pp can, with further details according to carrier number CINyyy and cost center number KSTvvv if required, be stored as more detailed value in a register R4pppCINyyyKSTvvv.

In every remote funding, a piece count value z allocated to a specific postage value p.pp can, for example, also be inventively interrogated and, as warranted, the value R4p.ppCINyyyKSTvvv stored in a matrix under a carrier number CINyyy and cost center number KSTvvv can be interrogated. The data center DZ and/or the mail carrier can statistically evaluate these data.

A statistics class, however, can likewise be defined as a set; the properties thereof must then be defined with at least one parameter type and with a description of the limits of the set and, as warranted, the operation of sets must be defined. The credibility of the piece counts covered in such statistics classes must then be determined in the data center in the framework of a plausibility check, which is implemented modified according to the set formation. A check of the postage meter machine on site can be ordered given non-credible piece counts.

Each and every franking can be counted in the appertaining predetermined statistics class in only one register, or can be counted in different, defined statistics classes in a number of registers. The local authority or the mail carrier, i.e. for whom the statistics data are registered in the postage meter machine FM, fixes the conditions therefor.

The data center DZ generates corresponding instructions of a form shown in FIG. 11 for the postage meter machine. The instructions include a header and a number of instruction datasets that respectively define an acquisition of statistics class data for one register. A termination with a checksum or an encrypted checksum (MAC) optionally ensues. These instructions are communicated to the postage meter machine (sent from DZ in the step 1008) in a transaction implemented in the step 386 or 3586 (FIGS. 5, 10). After reception of the new statistics instruction data (in the step 915), the authenticity of the instructions can be immediately checked by the processor of the postage meter machine FM and then can be more exactly interpreted in the step 213, possibly for error acquisition, or the processor deposits these instructions in a non-volatile memory in a suitable form and organizes the memory accordingly.

Following a franking or upon implementation of a franking, the postage meter machine FM interprets the instruction datasets, whereby the instructions are interpreted, and correspondingly updates to desired, internal FM statistics in the registers predetermined therefor. It is self-evident that the statistics mode, correspondingly modified by the processor, sequences within the franking mode (FIG. 2). At every franking or every printing or service that is implemented with the machine, a statistical acquisition of usage data is thus fundamentally possible when such an acquisition was previously specified with the aforementioned parameters. The specification for such an acquisition is also referred to below as statistics definition. The statistics definition can contain a pre-compression of acquired data. A statistics definition is derived from the aforementioned instructions and from a program stored in the program memory that interprets the instructions. The program itself cannot be manipulated or modified in the course of a communication. Moreover, carrier-specific conditions that are interrogated in the postage meter machine are stored in the aforementioned program. When these conditions are met, the postage meter machine calls the data center and sets up a communication connection.

When the data center DZ is called, the data center DZ can request the postage meter machine FM to communicate the acquired, possibly pre-compressed, stored data for central further-processing;

to set the data values in the FM statistics register to zero;

to communicate the statistics definition for monitoring purposes;

to delete the statistics definition, and, possibly, to store a new statistics definition in order to proceed according thereto in future.

The FM statistics registers can also continue to be accumulated beyond the interrogation without setting the data values in the FM statistics register to zero. When, proceeding from a previously determined piece count $\Sigma z'$, a piece count value z, for example, allocated to a specific postage value p.pp is always incremented only to the piece count value $\Sigma z$, the data center DZ can then determine the difference of the piece count values on specific sampling days or as needed. Of course, the data center must also store the previous data in its data bank therefor.

The piece count value $z = \Sigma z - \Sigma z'$ thereby determined by subtraction of the value in the previous call yields the increase. Of course, a zeroing of the values after every interrogation is also possible, so that $z = \Sigma z - 0$. The data center DZ stores the read values (statistics data) in the data bank related to postage meter machine or customer for further employment. The old and new statistics instruction data for the postage meter machine are also stored here.

An authorized external computer can now fetch the data, for example on sampling days, and further-process them as desired. Further, it can make new predetermination for the data center DZ for a pre-compressions [sic] or statistical acquisition modified in the future.

The specified statistics definition includes instructions for an arbitrary number of parameter classes and, possibly, their logical operation. Thus, specific statistics sets also can be produced. Added thereto are some functions for error handling and for further generalization, for example a division of the available memory capacity. The latter is important when one postage meter machine FM serves a number of mail carriers. In such a case, the available system resources are dynamically divided by the hardware-based and/or software-based automatic procedure. Such added instruction datasets, particularly for the division, are not shown in FIG. 11 for simplicity.

In the compatible, highest expansion level according to the inventive method, the data center is in the position to flexibly enter into specific, individual properties of every postage meter machine FM. All services to be performed in conjunction with the postage meter machine are stored according to parameter types in the form of a listing of codes, which is illustrated here in the example with the designations (C, D, G, P, K, W).

In conjunction with services performed with postage meter machines, it is also provided to evaluate additionally performed services in an indirect way. The protocol and the method were designed such that a communication of a modified statistics instruction ensues for the case wherein an interrogation of the data bank shows, for example, that a postage meter machine cannot accommodate certain selective imprints, for example "printed matter", because it does not contain these imprints in its memories or cannot even print them. This would mean that corresponding statistics information would be uncertain if such a fact were not taken into consideration. For such a case, an alternative pre-compression rule is communicated to this machine or to the corresponding data in the data bank are identified as uncertain in an evaluation that proceeds nonetheless, or to the uncertain data re eliminated. The initiator for the definition of the data pre-compression is always the data center, or a higher-ranking authority that converts the data acquisition and administration wishes for statistics details into the corresponding pre-compression rule to be communicated to the postage meter machine. As a result, one can flexibly react at any time to modified administration wishes of a higher-ranking authority without assistance from a service technician, or the postage meter machine user himself.

Further advantages are achievable with the inventive method. The method goes beyond merely making it difficult to tamper with a postage meter machine operated according to the inventive method. A person attempting tampering cannot react to modified data acquisition and administration wishes for statistics details fast and certainly not without substantial costs. Attempted fraud will thus no longer be a lucrative business in future. The basic elements listed below, which are preferably contained in the pre-compression description language, relate, in addition to a header, to the datasets:

| DATASET | DEFINITION |
|---|---|
| Header | command identifier, version number, number of description clauses "Regdef", length, etc. |
| Regdef1 | dataset for the definition of the first register |
| Regdef2 | dataset for the definition of the second register |
| Regdef3 | dataset for the definition of the third register |
| Regdefn | dataset for the definition of the $n^{th}$ register |
| BCC | checksum |

When franking with statistical evaluation according to a minimal version, the first and second dataset Regdef1 and Regdef2 structured in this way for the definition of the first and second registers effect respectively two entries in this example, namely the piece count of the frankings and the value sum. The accumulated postage usage thereby corresponds to the value sum $\Sigma P1$ that is derived from the multiplication of the piece count value z by the allocated, specific postage value 1.pp. According to the above instruction, the entry for the two statistics classes ensues into the register R41 .pp W-4 for the piece count and register R2 for the postage usage. The registers are components of the non-volatile memory 5a, or in an additional, specific cost center memory 16.

Another example of a more equipped version shall be explained below. The header requires 1 byte for the command identifier BK, 2 bytes for the version number NR, 1 byte for the number of "Regdef" description sets RD and 2 bytes for the length LG of the information. A maximum of 255 register definitions can derive. According to the above-listed minimal version, 5 "Regdef" description sets RD can thus already supply an adequate statistics.

An arbitrary number of parameter types can be defined for a freely selectable statistics structure, for example:

| Designation | Parameter type | Designation | Parameter type |
|---|---|---|---|
| C | carrier | G | weight |
| D | date | K | cost center |
| P | postage value | W | selective print |
| ... | ... | ... | ... |

A multitude of additional parameter descriptions can be defined, for example in order to define the upper and lower limits of a class (postal class or, respectively, postage value class or service class) or in order to define the affiliation or non-affiliation with a class. In the statistics mode, the affiliation with every class is correspondingly checked (FIG. 12a, 12b). Parameter descriptions are, for example:

| Designation | Description | Designation | Description |
|---|---|---|---|
| $\leq$ | upper limit | $\neq$ | dare not be met |
| $\geq$ | lower limit | 0 | must be met |
| $\cap$ | average | $\cap$ | union |
| ... | ... | ... | ... |

EXAMPLE

| BK = 1 | NR = 0101 | RD = 5 | LG = 139 | | | | | | | |
|---|---|---|---|---|---|---|---|---|---|---|
| 28 | 1 | C = | 2 | $\cap$ | C = 2 | $\cap$ | Du 980101 | $\cup$ | Do | 981231 |
| 28 | 1 | P $\geq$ | 100 | $\cap$ | P $\leq$ 999 | $\cap$ | W= 25 | $\cup$ | W$\neq$ | 40 |
| 28 | 1 | P $\geq$ | 1000 | $\cap$ | P $\leq$ 5999 | $\cap$ | W= 25 | $\cup$ | W$\neq$ | 40 |
| 28 | 1 | P $\geq$ | 1 | $\cap$ | P $\leq$ 5999 | $\cap$ | G $\geq$ 1 | $\cup$ | G $\geq$ | 20 |
| 21 | 1 | K $\geq$ | 1 | $\cap$ | K $\leq$ 9 | $\cup$ | K $\geq$ 8 | | | |
| BCC | | | | | | | | | | |

Including a BCC checksum with all five "Regdef" descrption sets RD (4 "Regdef description sets of 28 bytes each and one "Regdef" description set with 21 bytes) results in a header length LG $$LG=[(4*28)+21+BK+NR+RD+LG] \text{ bytes}=139 \text{ bytes} \quad (2)$$

overall for the information (shown in FIG. 11) to be communicated.

After the description of the header, five "Regdef" description sets RD, each of which respectively defines a statistics class, follow in the above example, shown in another five rows. The structure of all "Regdef" descriptions sets is similar and can therefore be explained by columns.

A data sequence communicated in the data transfer is illustrated on the basis of the block diagram of the statistics instruction data shown in FIG. 11 that serve for the definition of the statistics mode. The data sequence begins with a block 1101 that contains the command identifier BK and further blocks 1102, 1103, 1104 in the header for the identification and ordering of the following register definitions, which was already explained for the aforementioned table. These following register definitions have an identical structure that begins with a block 1110 for indicating the Regdef length. a block 1111 for a bng flag, a block 1112 for the parameter type and description and a block 1113 for size and limit values as well as a block 1114 for the operation then follow. This block sequence can repeat arbitrarily often within a register definition, possibly with a different parameter type and description as well as operation. A block 111$n$ for a checksum, preferably BCC checksum, optionally forms the termination of these statistics instruction data.

In the aforementioned example, 28 bytes per instruction dataset are required for the four first statistics classes and in the first block 1110 etc., through 111$n$-10 (see the first column in the exemplary table) of each "Regdef" description set RD referred to as "Regdef" length (except a shorter, fifth "Regdef' description set with 21 bytes). The condition "posting not given" is illustrated with a bng flag in the respectively second block 1111, etc., through 111$n$-9 (see the second column in the table) of every "Regdef" description set. A statistics set for further classes is continued only when posting has not already been performed elsewhere. The bng flag is set when a number 1 is entered in the second column. The parameter type and an appertaining description (conditions, limits, etc.) is noted in the third block (see the third column in the above table) of every "Regdef" dataset. In the aforementioned example ($3^{rd}$ columns), the descriptions in the third block 1112 through the block 111$n$-8 are valid for the following parameter types: CIN, currency units (for example, in $\frac{1}{100}$ EURO) and cost center number and the allocated lower parameter limits. A carrier identification number (CIN) is allocated to the mail carrier (Carrier), currency units are allocated to the postage value P and a cost center number is allocated to the department. The lower parameter limit values are recited in the fourth block 1113, through the block 111$n$-7 (see the example in the above table in the fourth column), with the value being equal to 2 for CIN, currency units being greater than 100, 1000 and 1, and cost center number being greater than 1. There is the possibility in the fifth block (see the fifth column in the above table) to define the logic operation within a class that is to be produced between two different or similar parameter types.

The upper parameter limits in the sixth block 1115 through the block 111$n$-6 are valid in the above example (see sixth column in the table) for the following parameter types: CIN, currency units (for example, in $\frac{1}{100}$ EURO) and cost center number. In the seventh block 1116 through the block 111$n$-5 (see the seventh column in the above table), the upper limit values for the above example are equal to 2 for CIN, currency units less than equal to 999, 5999, 5999 and cost center number less than equal to 3. The selectable possibilities for the logic operation exists respectively in the fifth (block 1114), eighth (block 1117) and eleventh blocks (columns). In the above example, an operation for the formation of a union set (union) resides in the eighth block (column) of the fifth "Regdef" description set (i.e. fifth statistics class) but an operation for the formation of an average set (average) resides in the others. Time windows for the data acquisition are respectively defined in the first "Regdef" description set in the ninth (block 1118) and tenth (block 1119) blocks (in the present example) through the thirteenth block (column). Expressed differently:

For the definition of the first statistics class, the sets of the parameter types "carrier" and date are combined to an average set according to the operation.

For the definition of the second and third statistics class, the sets of the parameter types "postage value" and "selective print" are combined to an average set according to the operation.

For the definition of the fourth statistics class, the sets of the parameter types "postage value" and "weight" are combined to an average set according to the operation.

For the definition of the fifth statistics class, the sets of the parameter types "cost center number" are combined to an average and union set according to the operation.

In the present example, an acquisition according to selective print types is defined in the respective ninth through thirteenth blocks (column) for the second and third class for a specific amount of postage value, and an acquisition within weight limits is defined for the fourth class.

The definition of the second statistics class is graphically illustrated in FIG. 13$b$. Although the postage value P=100 still falls into the average set of the amount P≧100 with the amount P≦999 (obliquely checkered rectangle), it no longer falls into the overall average set (black rectangle) with the average set (checkered rectangle) of the set of all selective prints except W=40 (W=40 is the missing circle sector) with the set of the specific selective print W=25 (lined rectangle). Such a specific selective print W=25 (lined rectangle) can, for example, be "air mail". The excepted selective print W=40 can be a stamp imprint "with return receipt" of a type that is standard for letters and packages.

Every dataset "Regdef" basically contains a number of conditions that are to be united according to a logic operation per statistics instruction data. A logic operation "average" thereby refers to conditions that must apply multiply but in different ways at the same time so that the franking is counted in the corresponding "Regdef" register.

Another combination of logic operations refers to conditions, services or parameter types of which only one need apply in order to be counted in the union set. For example, a union exists when a posting undertaken for clients (cost centers 1 through 3) is to be statistically acquired together with another posting (cost center 7 of the postage meter machine user) because experience has shown that similar services of the mail carriers are always made use of.

The definition of the fifth statistics class in the above example shall be explained on the basis of FIG. 13$a$. The sets of the parameter types "cost center number" comprise the set K≧7 (white rectangle) united with the average set (obliquely checkered rectangle) from the set K≧1 (hatching slanting from top right to bottom left) with the set K≦3 (hatching slanting from top left to bottom right). The resultant average and union set is bounded with thicker black lines.

As a rule, the definition given within the various datasets "Regdef" refers to data, i.e. when nothing to the contrary is indicated in the Regdef itself, that are to be logically operated with an operation called "average." The contrary is indicated by the set bng flag ("one" in the $2^{nd}$ column in the above table) in addition to an operation called "union." A multiple involvement of data in the statistics is then precluded, i.e. the data are counted only once.

A franking can likewise be counted in a number of registers, with each register storing a specific detail of the statistics in the aforementioned data form. This is identified by the absence (non-setting) of bng flag ("zero" in the $2^{nd}$ column in the above table) at the beginning of every register definition. For example, a shipping as printed matter with the value of 1.00 EURO can be counted in the following registers:

R400,0100,0999 for frankings in the postal class 1.00 through 9.00 EURO.

R401,0001,5999 for printed matter in the postal class 0.01 through 59.99 EURO.

R409,0101,1231 for arbitrary frankings in the time span from Jan. 1, 1998 to Dec. 31, 1998.

Instead of ensuing in EURO, the funds can be denoted in U.S. dollars or in another standard currency unit.

Each and every dataset Regdef identifies an arbitrary dataset with an arbitrary logic operation and contains at least conditions for the length, validity duration, quantitative conditions and qualitative conditions such as, in particular, specific conditions for the shipping mode, the service type and general conditions about the carrier and, possibly, the cost center. Thus deriving is a dataset:

REGDEF

| | |
|---|---|
| a) Length: | of the definition in bytes |
| b) bng-flag: | residualness, previously not booked flag, i.e. only continue the statistics when the parameter was not already booked somewhere in other registers. The priority derives from the sequence of the bookings. When the flag is set, an entry in this register can only ensue if another booking was not aiready made elsewhere. "Other services with identifier xxxx" can thus be easily implemented. |
| c) Parameter type: with parameter description: | Carrier C, date D, postage value P, weight G, cost center K, selective prints including types; lower limit $\geq$, upper limit $\leq$, must be met =, cannot be met $\neq$, among other qualitative conditions (in particular, for specific conditions about shipping mode: The actual conditions regarding shipping mode or selective prints are defined with one byte. These bytes have a number of expressions); |
| d) quantitative conditions: | value or, respectively, amount particular; | e) logical operations of adjacent parameter types and their descriptions; (possibly further statistics instruction types in the same sequence or repetition of c) and e) up to the end of the Regdef set).

The definition of the shipping parameters ensues in advance by the postage meter machine manufacturer. Uniform, country-specific identifiers are preferred. It is only important that these are country-specifically unambiguous. (For example, printed matter=1, c.o.d.=2, maxi letter=3, foreign A=4, rebate type 1=79, etc . . . ).

The above example assumes a specific public mail carrier, however, it can also be expanded to other public or private carriers CIN. The data center transmits these instructions to the postage meter machine. As warranted, the number of the cost center KST-No. can also be co-transmitted as a criterion, for example in the format Flags/Kst-min/Kst-max. The latter is dependent on the configuration degree of the respective machine with a corresponding hardware and software. The data bank of the data center contains the required particulars about the possibilities of the machine. A statistics inquiry of a carrier can thus by correspondingly processed in order to program even more conditions f) and g), which are then communicated to the postage meter machine. The postage meter machine is thus placed into the position to maintain a predetermined franking statistics.

For example, three memory areas 16-01, 16-02, 16-03 are provided in the cost center memory 16. One of the memory areas is 16-01 and provided for invariable accounting structures. As previously, the statistics-related procedure here always ensues in the same way. A further memory area 16-02 is provided for the acquisition of entry data according to the modifiable statistics instructions. The statistics procedure here ensues in the way required by the mail carrier, i.e. not always in the same way but differently on demand. The microprocessor is programmed to correspondingly access these memory areas, however, it carries out instructions that are stored in a third memory area 16-03 for the variable accounting or the statistics structure. This includes the instruction data communicated from the data center with which the data center can freely define the statistics classes.

Of course, such memory areas for modifiable accounting structures can also be realized in the non-volatile memories 5a or 5b that were originally provided only for the accounting data and are fashioned as long-term memories. Optionally, a checksum can be appended to the dataset of the statistical acquisition. Given securing with an encrypted checksum (MAC), however, storage in an arbitrary other storage medium represents no problem.

A statistics set thus can be maintained with the postage meter machine, whose memory area was preferably expanded according to the memory bank principle, and thus a service can be provided for a selected mail carrier. As a result of the above-described automatic procedure, this statistics set is always objective. Security provided by a MAC protects the data against subjective influences or a manipulation. Such a protected statistics set is also usable for the subsequent reconstruction of data that were thought lost.

A transmission of instructions ensues from the data center to the postage meter machine and the deletion of stored, old statistics data after a transmission of new statistics instruction data for forming a new statistics mode is implemented by the microprocessor of the postage meter machine. In particular, the deletion of stored, old statistics instruction data is implemented by the microprocessor of the postage meter machine after a verification of transmitted, new statistics instruction data during or as the outcome of a non-volatile storage of the new statistics instruction data. For example, the transmission and intermediate storage of new statistics instruction data ensues in a preceding transaction and a deleting of the statistics data in a first, predetermined memory area ensues during a following, further transaction, whereby the deleting is implemented in conjunction with the successfully ended, error-free, preceding transaction with the transmission of new statistics instruction data from the data center to the postage meter machine.

Like the deletion of old statistics data, the deleting after a check of the transmitted instructions for the formation of a new statistics mode is likewise implemented by the microprocessor of the postage meter machine. The check may be connected with a transmission of an externally stored, predetermined checksum value into the internal OTP-RAM for volatile storage and with a formation of a checksum in the OTP processor over the content of that external memory that stores the transmitted instruction data, as well as with a comparison of the checksum volatilely stored in the internal OTP-RAM to the checksum that is formed. The comparison ensues in the communication mode 300 or 350 with the internal processing unit (OTP CPU) according to FIG. 1b.

Inventively, the pre-compression of data for at least one of the statistics classes ensues in the postage meter machine with a logical operation of those sets to which the data belong. The membership of data in a statistics class is determined with a check step, whereby the microprocessor interprets the instructions for a register definition that are provided in the communicated statistics instruction data.

Finally, the executive sequences of sub-steps which are executed within a check step 422 (FIG. 12a) is explained on the basis of FIG. 12b. A first sub-step 4221 checks whether the communicated statistics instruction prescribed a bng flag in Regdef2, second block. If this is not the case, the sub-step 4223 is reached and, according to the statistics instruction in Regdef2, in the third block, non-volatilely stored in the memory area 16-03, the microprocessor of the control unit 6 can set a comparison parameter type Y in the memory area of the main memory 7 (RAM) to the parameter type P (postage value). Further, the appertaining description and limit values are fetched and are likewise volatilely stored in the RAM. Otherwise, if a bng flag is set by the instruction (second block), the sub-step 4222 is reached in order to determine whether a b-flag has been set by the microprocessor of the control unit 6 in the memory area of the main memory 7 (RAM). A set b-flag signals that a posting has already ensued once in the previous statistics class (in the step 421). In such a case, a branch is made to the next statistics class check, etc., through all remaining interrogations up to the end of the statistics mode in order to avoid a double posting.

Otherwise, a b-flag that is not set signals that an updating (incrementing) of the registers is allowed to ensue in one of the remaining statistics classes and the aforementioned sub-step 4223 is reached in order to set Y. Subsequently, the microprocessor of the control unit 6 compares all of the parameter types set for the respective service (franking) to the parameter type Y in the sub-step 4224. Given agreement with the parameter type Y, a determination as to whether one of the settings of the postage meter machine is to be incorporated into the determination is made in the following interrogation steps 4225 through 422n on the basis of the appertaining description and limit values. The result is interpreted in a subsequent sub-step 422n+1 on the basis of a stored interpretation program. A check is then made in sub-step 422n+2 as to whether, according to instruction, a next block of the same class or a block of the next class must be processed. In the latter instance, the end of the Regdef dataset is reached, and a branch is made to a step 423 in order to update the statistics for the second statistics class (increment piece count in the appertaining register) and in order to then branch to the next check step 424 for the third statistics class. Otherwise, if the end has not yet been reached, a branch is made from the sub-step 422n+2 to a sub-step 422n+3 in order, according to the statistics instruction, to call the operation and the next instruction with respect to parameter type and the description thereof as well as to call any limit values. Subsequently, a determination is made in the sub-step 422n+4 as to whether an operation with another parameter type was instructed. In such a case, a branch is made back to the sub-step 4223. Otherwise, when the comparative parameter type Y is instructed unmodified, a branch is made to the sub-step 4224. If a set parameter of the type of the comparison parameter is now found in the sub-step 4224, the interpretation as to whether a membership in the average set is present can ensue in the sub-step 422n+1 after executing at least one of the sub-steps 4225 through 422n. In the above example, this is true of the average set P≧100∩P≦999. When membership in the average set is found, an inquiry is made in the sub-step 422n+2 as to whether the end of the register definition has been reached and, otherwise, another branch is made to the sub-step 422n+3 in order to call further operations and instructions, for an overall average set in the above example. The statistics for the second statistics class can only be updated when the parameter values set at the postage meter machine that are predetermined and operated in a defined way fall into this overall average set P≧100∩P≦999∩W=25∩W*40. If only a single parameter value of the parameter values that were predetermined and operated in a defined way was not set at the postage meter machine, this is found in the sub-step 4224. If, for example, the selective print W=40 (a stamp imprint "with return receipt") were set, then a branch is made again to the next check step 424. If, however, a selective print W=35 (insured letter) were set instead, then the condition everything except stamp imprint "with return receipt" applies and the franking would be counted in the second statistics class, assuming the other conditions are likewise met (see the graphic illustration in FIG. 13b).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for statistics mode reloading and statistics acquisition according to statistics classes in storage of data in a postage meter machine which can communicate with a data center located remote from the postage meter machine, the method comprising the steps of:

(a) operating said postage meter machine to conduct frankings and causing said postage meter machine to enter into a statistics mode wherein data associated with said frankings are stored in respective statistics classes;

(b) forming freely selectable new statistics instruction data at said data center for a future statistics mode, said instruction data including instructions for forming new statistics classes and for pre-compression of statistics mode data;

(c) establishing communication between said postage meter machine and said data center and transmitting said data in said statistics classes from said postage meter machine to said data center, and transmitting said new statistics instruction data from said data center to said postage meter machine;

(d) transmitting an instruction from said data center to said postage meter machine to cause said postage meter machine to non-volatilely store said new statistics instruction data in said postage meter machine; and (e) operating said postage meter machine to conduct further frankings and causing said postage meter machine to enter into said statistics mode wherein data associated with said further frankings are pre-compressed, stored in respective statistics classes, and interpreted according to said new statistics instruction data.

2. A method as claimed in claim 1 wherein said data associated with said frankings in step (a) comprise old data, and wherein step (c) further comprises deleting said old data from storage in said postage meter machine upon transmittal of said new statistics instruction from said data center to said postage meter machine.

3. A method as claimed in claim 1 wherein said data associated with said frankings in step (a) comprise old data, and wherein step (d) deleting said old data from storage in said postage meter machine upon receipt by said postage meter machine of said instruction to non-volatilely store said news statistics instruction data in said postage meter machine.

4. A method as claimed in claim 1 comprising conducting steps (c) and (d) automatically after expiration of a predetermined time.

5. A method as claimed in claim I wherein said frankings in step (e) are for transporting mail using a new carrier, not available for said frankings in step (a), and said method comprising conducting steps (c) and (d) when said new carrier becomes available.

6. A method as claimed in claim 1 wherein step (a) comprises storing old statistics instruction data, defining the respective statistics classes employed in step (a), in a designated memory area of a memory in said postage meter machine, and wherein step (c) comprises a transaction between said postage meter machine and said data center, and said method comprising the additional steps of:

upon completion of said transaction, conducting an error routine in said postage meter machine to determine whether said transaction was successfully completed without error; and upon a determination in said error routine that said transaction was successfully completed without error, deleting said old statistics instruction data in said designated memory area and storing said new statistics instruction data in said designated memory area in place thereof.

7. A method as claimed in claim 1 wherein step (e) comprises pre- compressing said further data with a logic operation performed on respective statistics classes in which said further data are contained, and further comprising conducting a separate review step for determining membership of said further data in the respective statistics classes dependent on said new statistics instruction data.

8. A method as claimed in claim 1 wherein step (b) comprises including verification data in said new statistics instruction data and storing said verification data at said data center, and wherein step (d) comprises:

following receipt of said new statistics instruction data by said postage meter machine in step (c), extracting said verification data from said new statistics instruction data at said postage meter machine;

transmitting said verification data from said postage meter machine to said data center;

comparing the verification information transmitted to said data center from said postage meter machine to the verification information stored at said data center; and upon finding coincidence of said verification data transmitted from said postage meter machine to said data center with said verification data stored at said data center, transmitting said instruction from said data center to said postage meter machine to cause said postage meter machine to non-volatilely store said new statistics instruction data in said postage meter machine.

9. A method as claimed in claim 8 wherein said news statistics instruction data has a version number uniquely associated therewith, and wherein said verification data comprise said version number.

10. A method as claimed in claim 1 wherein the data associated with said frankings in step (a) are stored in said respective statistics classes dependent on old statistics instruction data stored in said postage meter machine, and wherein step (d) comprises:

after receipt of said new statistics instruction data by said postage meter machine in step (c), intermediately, volatilely storing said new statistics instruction data in said postage meter machine;

forming a checksum over said intermediately, volatilely stored new statistics instruction data in said postage meter machine;

transmitting said checksum from said postage meter machine to said data center;

at said data center, comparing the checksum transmitted to said data center by said postage meter machine to a predetermined checksum value for said new statistics instruction data; and upon coincidence of the checksum transmitted from said postage meter machine to said data center with said checksum value, transmitting said instruction from said data center to said postage meter machine to cause said postage meter machine to non-volatilely store said new statistics instruction data in said postage meter machine as a replacement for said old statistics instruction data.

11. A method as claimed in claim 10 comprising the additional step of assigning a unique PIN to said postage meter machine, and wherein step (b) comprises including a PIN in said new statistics instruction data at said data center, and wherein step (c) comprises transmitting said new statistics instruction data from said data center to said postage meter machine as encrypted data, and said method comprising the additional steps of:

upon receipt of said encrypted data at said postage meter machine, before intermediately volatilely storing said new statistics instruction data, decrypting said encrypted data to obtained decrypted data and extracting said PIN from said decrypted data;

comparing the PIN extracted from the decrypted data to the PIN assigned to the postage meter machine and, only upon coincidence between the PIN extracted from the decrypted data and the PIN of the postage meter machine, then intermediately, volatilely storing said new statistics instruction data.

12. A method as claimed in claim 10 comprising providing a one-time programmable (OTP) processor in said postage meter machine, said OTP processor having an internal program memory containing an algorithm for forming a checksum and for encrypting said checksum, said OTP processor having an internal main memory, and providing a separate memory in said postage meter machine apart from said internal main memory of said OTP processor, and wherein step (d) comprises:

intermediately, storing said new statistics instruction data in a main memory of said postage meter machine;

forming a checksum over the new statistics instruction data contained in said main memory of said postage meter machine using said algorithm and forming an encrypted message containing said checksum in encrypted form;

transmitting said encrypted message from said postage meter machine to said data center;

decrypting said encrypted message at said data center and extracting said checksum therefrom;

comparing the checksum extracted from the decrypted message at said data center to a predetermined checksum value stored at said data center;

only upon coincidence of said checksum extracted from said decrypted message with said predetermined checksum value, transmitting said instruction from said data center to said postage meter machine to cause said postage meter machine to non-volatilely store said new statistics instruction data in said postage meter machine; and upon receipt of said instruction from said data center to said postage meter machine to cause said postage meter machine to non-volatilely store said new statistics instruction data in said postage meter machine, transferring said intermediately, volatilely stored new statistics instruction data from said main memory of said postage meter machine and non-volatilely storing said new statistics instruction data in said separate memory of said postage meter machine.

* * * * *